(12) United States Patent
Goldberg

(10) Patent No.: US 10,863,757 B2
(45) Date of Patent: *Dec. 15, 2020

(54) PET-MEDICINE-CAPSULE WRAPPER APPARATUS AND METHOD

(71) Applicant: Mary Elizabeth Goldberg, Sacramento, CA (US)

(72) Inventor: Mary Elizabeth Goldberg, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,496

(22) Filed: May 22, 2019

(65) Prior Publication Data

US 2019/0320687 A1    Oct. 24, 2019

Related U.S. Application Data

(62) Division of application No. 15/230,888, filed on Aug. 8, 2016, now Pat. No. 10,299,496.

(60) Provisional application No. 62/204,621, filed on Aug. 13, 2015.

(51) Int. Cl.

| | |
|---|---|
| *A23K 40/35* | (2016.01) |
| *A23K 50/40* | (2016.01) |
| *B65B 11/00* | (2006.01) |
| *A23K 40/30* | (2016.01) |
| *B65B 11/54* | (2006.01) |
| *B65B 25/00* | (2006.01) |
| *B65B 5/10* | (2006.01) |
| *A23K 20/158* | (2016.01) |
| *A23K 50/42* | (2016.01) |
| *A23K 40/25* | (2016.01) |

(52) U.S. Cl.
CPC ............ *A23K 50/40* (2016.05); *A23K 20/158* (2016.05); *A23K 40/25* (2016.05); *A23K 40/30* (2016.05); *A23K 50/42* (2016.05); *B65B 5/103* (2013.01); *B65B 11/004* (2013.01); *B65B 11/54* (2013.01); *B65B 25/006* (2013.01); *B65B 2220/16* (2013.01)

(58) Field of Classification Search
CPC ......... A23P 20/20; A23K 40/30; A23K 40/35; A23K 50/40
See application file for complete search history.

(56) References Cited

U.S. PATENT DOCUMENTS

| | | |
|---|---|---|
| 7,115,297 B2 | 10/2006 | Stillman |
| D578,727 S | 10/2008 | Frawley et al. |
| D587,428 S | 3/2009 | Torney et al. |
| 8,501,218 B2 | 8/2013 | Hurwitz |
| 10,299,496 B2 * | 5/2019 | Goldberg ............. A23K 20/158 |
| 2005/0100640 A1 | 5/2005 | Pearce |
| 2005/0255148 A1 | 11/2005 | Puma |
| 2007/0009576 A1 | 1/2007 | Stillman |
| 2010/0316768 A1 | 12/2010 | Stillman |
| 2011/0076363 A1 | 3/2011 | Niehues |
| 2011/0256208 A1 | 10/2011 | Ling |
| 2013/0309293 A1 | 11/2013 | Axelrod et al. |
| 2013/0340685 A1 | 12/2013 | Grepper |

FOREIGN PATENT DOCUMENTS

WO    WO2004023899    3/2004

OTHER PUBLICATIONS

Pill-O's, Tasty pilling treats for dogs, http://www.entirelypets.com/pill-os-tasty-pilling-treats.html, Nov. 17, 2014.
Greenie® Pill Pockets, http://www.greenies.com/dogs/pill-pockets.aspz, Nov. 17, 2014.
Milenna Russell, How to make your own pill pockets, http://www.ehow.co.uk/how_7434547_make-own-pill-pockets.html, Nov. 17, 2014.
Nutri-Vet, Hide'ems, https://chewy.com, Nov. 17, 2014.
Greenie®, https://www.chewy.com/greenies-hip-joint-care-large-dental/dp/101496, Oct. 25, 2016.
VetIQ Pill Treats, https://www.amazon.com/VetIQ-Treats-Chews-Chicken-Flavor/dp/B01HCJP7YK/ref=sr_1_1?ie=UTF8&qid=1479326552&sr=8-1&keywords=pill+pockets+for+dogs+vetiq, Nov. 9, 2016.
Complete Natural Nutrition Pill Buddy Naturals Chicken, https://www.amazon.com/Complete-Natural-Nutrition-Naturals-Chicken/dp/B00DRHTE1O/ref=sr_1_1?ie=UTF8&qid=1479326601&sr=8-1&keywords=pet+supplies+complete+natural+pill+buddy, Nov. 9, 2016.

* cited by examiner

*Primary Examiner* — Micah Paul Young
(74) *Attorney, Agent, or Firm* — Pate Baird, PLLC

(57) ABSTRACT

Methods and compositions for obscuring medicines formed as tablets, capsules, pills, and so forth may be presented in clean packaging, with built-in work space on a substrate, film layer. A flexible paste, gum, putty, or malleable and formable treat material may be folded without touching the actual treat composition on its outermost surface. A medicament set onto a location on a surface of the composition may then be folded inside by folding, molding, or otherwise manipulating the composition, thus forming a sealed morsel, leaving no residue (e.g., powder, scent, taste, etc.) of the medicament on the outer surface of the composition when administered to a pet.

20 Claims, 11 Drawing Sheets

PET-MEDICINE-CAPSULE WRAPPER APPARATUS AND METHOD

RELATED APPLICATIONS

This application: is a divisional (continuation) of U.S. patent application Ser. No. 15/230,888, filed Aug. 8, 2016 and due to issue May 28, 2019 as U.S. patent Ser. No. 10,299,496; which claims the benefit of U.S. Provisional Patent Application Ser. No. 62/204,621, filed Aug. 13, 2015, which is hereby incorporated by reference in its entirety.

BACKGROUND

Field of the Invention

This invention relates to treats for pets and, more particularly, to novel systems and methods for treats designed to hide or otherwise contain tablets, pills, capsules, and the like administered as medicine or other supplements to pets.

Background

The medicine of pets and other livestock takes on many of the aspects of medicine administered to human beings. However, several major distinctions are problematic. For example, individual people have a will. Personal will may often override preference or desires and accept, receive, or otherwise take the administration of medicines as directed by a physician, knowing the importance thereof. Animals are not so inclined, if they do not like the taste or smell of an object, thing, or substance. They will typically not take it into their mouths, or will discharge it immediately upon sensing the taste, texture, or nature thereof.

Medicine for humans tends to be quite expensive, and supported by the importance of it to human beings. The medical treatment of livestock must necessarily be less expensive. In the case of agricultural livestock, the costs must be appropriate to the value of the animal. All costs of care are closely controlled.

Medicine administered to pets and other livestock suffers from certain problems not common with human patients. For example, human patients often warrant the extra expense of highly developed medicines. Moreover, if human life and health are at stake, typically no reasonable expense is spared. On the other hand, livestock may be commercial animals, in which medical treatment and medicines substances must be cost effective in view of the economic value of the animal treated.

Of course, it may go without saying that some people treat their pets almost as members of the family. Therefore, the line between the cost for treating people, that for pets and the cost for treating agricultural animals may be somewhat blurred economically. Nevertheless, and notwithstanding the attempts by marketers to encourage pet owners to treat the pets as human members of the family, medicines for pets do not typically warrant the same cost.

However, a more serious difference is the effect of will and reason on the behaviors of the "patients." A human patient, at least an adult, can reason and understand the importance of taking medicine. Accordingly, taste is not as important to an adult as it may be to a child or an animal. On the other hand, animals will simply refuse to accept or receive administered medicines that have an unacceptable flavor, smell, texture, or the like. Thus, animals must either be persuaded in the case of capsules disguised or flavored to alter their appearance or taste. Likewise, it is not uncommon for pet owners to hide a capsule, tablet, or other medicine in a chunk of meat, a glob of peanut butter, or to otherwise mask its smell and taste. This results in messy preparation and regular cleanup duties, of smelly substances that still cling to hands and work spaces.

Certain products exist, but typically are somewhat expensive, do not have clean packaging, soil hands of a pet owner, do not seal up and completely obscure taste, visibility, or smell, or some combination thereof, and so forth. Meanwhile, typical compositions that are calculated to hide medicines leave residues on counters, on hands, clothing, and so forth. Thus, keeping clothing clean, washing hands repeatedly, cleaning up countertops, and so forth all take time, attention, and may accidentally be missed until it is too late and the residues have been spread.

Thus, it would be an advance in the art to provide something that is simpler, less messy, more secure, and more certain to fully hide visually and obscure both taste and smell. It would be an advance in the art to provide a system and method for making, using, and administering a cover or wrap that obscures the taste, visual image, and smell consistently for typical medicines formed as tablets, capsules, or the like.

BRIEF SUMMARY OF THE INVENTION

In view of the foregoing, in accordance with the invention as embodied and broadly described herein, a method and apparatus are disclosed in one embodiment of the present invention as including a treatment pack that may actually correspond to a treatment regimen. This number corresponds to the typical treatment patterns or regimens that last for either one week with treatments administered twice a day or ten days with treatments administered twice daily.

For example, a treatment pack may include a course of two treat servings per day over a course of treatment lasting seven days or ten days. Thus, if two pills, tablets, capsules, or the like are to be administered per day in a standard antibiotic, the regimen will typically include one administration in the morning and one in the evening, typically twelve hours apart.

In certain currently contemplated embodiments, a substrate or card provides a working surface that is comparatively stiff and will maintain the shape of the treat wrap. It will indicate the number of treat wraps on a card, and thus remind how many have been used and how many remain in a particular course or regimen of administration. Thus, a pet owner or consumer purchasing a product in accordance with the invention can immediately determine whether they have forgotten a previous administration of a pill or tablet, and so forth.

Typically, the cards may be formed as a work surface being comparatively stiff, such as the cardboard or paper board backing on the back of a writing pad. Meanwhile, another film layer typically of a polymeric film such as polyethylene is secured in place along at least a line near the center of the length thereof. Thus, the film will not twist or turn with the respect to the underlying substrate or card, but yet can be lifted up and folded over in order to manipulate a particular wrap of the treat material without a pet owner actually touching that wrap.

In certain embodiments, a package may include a box, and may include an internal, re-sealable plastic bag with a zipper type of closure or the like. A consumer or pet owner may open the box, and find inside several courses of treatment. For example, a card of ten or fourteen or two cards of ten or a single card of twenty may be configured.

A course of treatment depends on the particular medicament being prescribed by a veterinarian. Typically, a course of treatment may last five days, one week, or ten days. Typically, administration will be either once per day or twice per day. Other regimens may also be specified. Typically, a card in accordance with the invention may provide for optional ten-, fourteen-, or twenty-dose courses of treatment on a single card with its associated film.

In use, a pet owner may remove one set or one product course of treatment from a box, open the re-sealable bag in which it is found, draw out the card with its film and treat wrap content, and set the card on a countertop or table. The user may then set the medicament, whether a tablet, pill, capsule, liquid drop, powder, or the like on a marker on the wrap. The pet owner then may fold the film in order to fold half the wrap over the other half thereof.

Typically, the wraps are formed in a square shape, but arranged on a card so that they operate as diamonds. A lateral axis is the folding axis, and a longitudinal axis is orthogonal thereto. Thus, one longitudinal corner folds over to an opposite corner. The film then permits pressuring the sandwiched layers of the wrap together, thus forming them together in a seal.

Typically, a pet dog will simply swallow a treat whole. Cats may also swallow treats whole, but may more often chew or tear them. If the taste and smell of the treat are appropriate, they will typically be gulped down.

Some of the benefits provided include keeping a work surface such as a countertop clean. The film on which the wraps are disposed is flexible enough to fold over the wrap and manipulate it into shape, including pressuring the edges to seal them together. Because the film is lifted from below and folded over the wraps, hands never actually touch the edible wrap material.

The wrap material may be a paste, a formable taffy a modeling-clay-like solid, or the like. Typically, a tacky, moldable solid will be suitable. It will typically have an oil content suitable for absorbing and containing a flavoring.

Typical materials may be thixotropic materials or Bingham plastics. A thixotropic material is understood in engineering to be a material that will typically support itself or its own weight in modest thicknesses and other dimensions, but will move when exposed to a certain amount of sheer force. Fluids flow under all forces, regardless of how small. Thixotropic materials are dimensionally stable until a threshold amount of force is applied. Similarly, a Bingham plastic operates substantially as a solid until a certain threshold sheer force is applied, after which time it becomes fluid and moves in response to the force.

Typical thixotropic materials are toothpaste, peanut butter, and similar substances. Meanwhile, various moldable putty-like materials may also be used. Some compositions of foodstuffs contain solids and tacky fluids that combine to make such materials formable. Various formulae exist. Herein, any one of those formulae may be suitable. Peanut butter, particularly when a certain portion of the oil is removed, may become quite solid in behavior, while still remaining tacky, moldable, and so forth. Meanwhile, other compositions exist using some amount of fiber, solid, and interstitial binding such as an oil, an emulsion, a grease, or some other long-chain polymeric foodstuff.

In certain embodiments of an apparatus and method in accordance with the invention, a wrap composition may be set out in dose sized, individual wraps on a single sheet. These may be arranged on a grid, or may be offset into an "Argyle" pattern. Meanwhile, the daily doses are aligned along a line. The count is fixed for each card, and a user can immediately tell how many doses have been used and how many remain.

Fingers, fingertips, nails, and the like remain free because the composition is never touched before feeding or administering. The medicament is placed inside, near the center of each diamond, and is sealed around the outer periphery once the diamond is folded over into a triangle. Of course, corners may be rounded. Thus, the wraps do not smell like a human, nor do they have a scent or taste of a medicament on their outer surface.

It is contemplated that at least two sizes may be created, one suitable for small dogs and for cats, another for larger dogs. Similar materials for other animals, such as porcine, bovine and equine animals are within contemplation. Due to the nature of the composition being typically thixotropic or otherwise a moldable solid, the wraps hold their shape, contain their flavor, and obscure the flavors and scents of the medicaments inside. No untoward residue is ever on the outside thereof.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
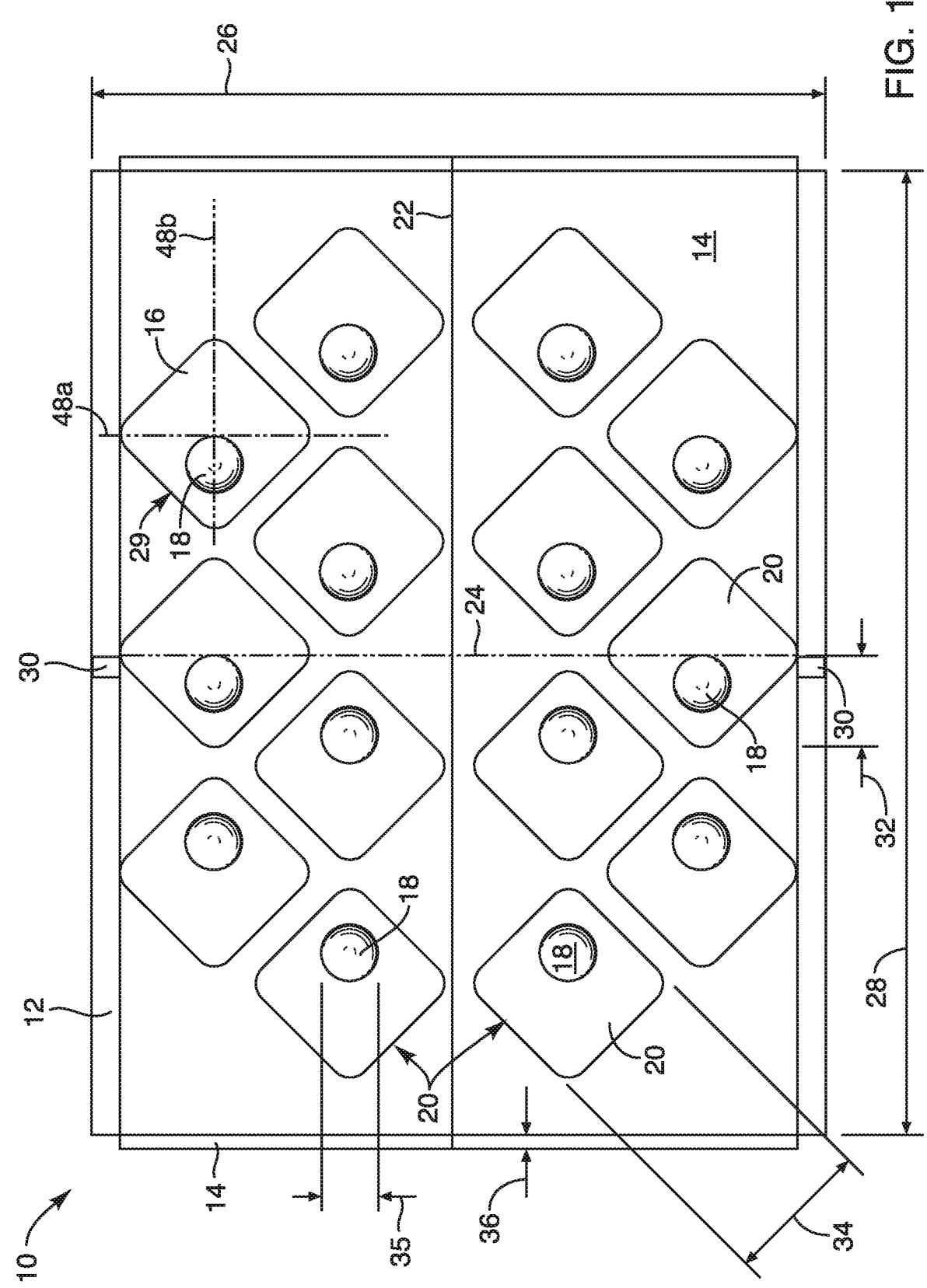
FIG. 1 is a top plan view of one embodiment of a composition and system in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, and FIGS. 1 through 18 generally, a product 10 or system 10 in accordance with the invention may typically include a base 12 operating as a substrate 12 or card 12. Typically, the base 12 has sufficient thickness and stiffness that it will maintain its dimensional stability in use. The base 12 provides a work surface or bench whereon a user (pet owner) may work to create treats hiding medicaments, typically in the form of pills, capsules, tablets, or the like.

Notwithstanding the particular applicability to such forms, the product 10 in accordance with the invention is equally adaptable to certain liquids, powders, and so forth. Moreover, depending on the particular size of the medicament administered and the size of the particular product 10, the administration of multiple doses or multiple different such objects may be hidden within a single unit.

In the illustrated embodiment, a layer 14 or film 14 is typically sufficiently flexible to be foldable. Nevertheless, it is also the supporting film 14 maintaining a stability of the shape of an "edible" 16 or a material 16. This edible 16 or wrap 16 is a formable layer 16, formed as a discrete object 16, square with rounded corners in the illustrated embodiment. However, notwithstanding its comparatively squarish shape, rounded corners provide for economy, handling, and ease of removal from the film 14. It may include other manufacturing and use benefits.

The layers 16 may each be provided with an accent 18 or accent region 18 containing a flavor burst 18 or flavor pocket 18. The accent 18 may be placed on the layer 16 of the edible 16. On the other hand, in some embodiments, the accent 18 may pass or extend completely through as a heavily dosed or flavored portion of the layer 16.

One benefit of providing the accent 18 extending through to the outer surface, or what will become the outer surface (against the film 14 in the product 10, before use), is that the scent and flavor of the accent 18 become stronger and more apparent to the consuming pet. On the other hand, the accent region 18 may simply be marked on the top or upper surface of the layer 16, with the actual flavoring being on the opposite surface thereof but still in the accent region 18.

One reason for the various options for placement of the accent region and the actual flavoring that becomes the flavor burst 18 or accent 18 is that on the upper surface illustrated, the accent region 18 serves as a marker. It may have a color different from that of the underlying layer 16.

A user can see exactly where to place the medicament (e.g., tablet, capsule, pill, etc.) The medicaments should not cross the fold line 48a or lateral axis 48a of a particular layer 16, which is actually a single piece 16. That is, by placing a medicament right in the center of the square or diamond shape of a layer 16, the folding process does not operate as designed. The diamond shape or the diamond configuration of the square shape provides a simple folding of the diamond into a simple triangle. All the sides match up in the folding and the sealing together required to enclose the medicament. In the illustrated embodiment, the four edges of the diamond are all the same length. When folding across a diagonal, the layer 16 forms a triangle that quickly and easily seals along all edges thereof.

Together, the edible 16 or edible layer 16 that becomes formable, together with the flavor burst 18 or accent region 18 placed thereon on one surface or the opposite surface, form a wrapper 20. The wrapper 20 operates as a treat 20 containing a medicament placed on the accent region 18 inside the wrapper 20.

In order to operate properly, the product 10 may be formed such that the film 14 has a cut line 22 or a median 22 separating two halves of the available course of treatment provided by the product 10. In this way, a single set of the wrappers 20 may be folded, one at a time.

Meanwhile, a center line 24 extending across the width 26 of the card 12 or base 12 may include means of securement. For example, approximately half way along the length 28 of the base 12, an attachment mechanism 30 or an adhesive layer 30 may interpose between the film 14 and the base 12. Typically, sewing, heat bonding, mechanical fastening, gluing, or the like may be used to secure the film 14 to the base 12.

Typically, it is preferred that the width limit 32 or width 32 of any adhesive 30 or other attachment mechanism 30 should extend from about the center or diagonal, of a wrapper 20 along the center line 24. The attachment mechanism 30 or adhesive 30 should not extend beyond the outermost point of that particular wrapper 20 beyond the width limit 32.

One reason for this is that if the entire width limit 32 were filled with adhesive between the film 14 and the base 12, there would still be no problem in folding from either direction. Meanwhile, the adhered portion of the film 14 would always contain only that half of a wrapper 20 or the formable layer 16 of a wrapper 20 that remains rigid on the film 14 over the base 12 during folding. Thus, operation of the product 10 would still be satisfactory.

The dimensions of the wrappers 20 may be adapted to the particular patient or animal that will receive the medicament in a wrapper 20 or a treat 20. Typically, in one embodiment, a width 34 of from about one to about two inches has been found suitable. In certain embodiments, about one and one third inches has been found suitable for a large variety of animals and medicaments. Accordingly, the diagonal will be equal to the length 34 or width 34 of one side multiplied by the square root of two according to the rules of geometry.

Similarly, the diameter 35 or maximum dimension 35 of a flavor burst 18 or accent region 18 may be suitable to leave a region near the outer edges that will be available for sealing without interference from the accent region 18. For example, the accent region 18 may not have the same moldable features, or may not adhere as readily to the formable layer 16. It may be formed of the same material with an accented flavor, or may be formed of a different material. Regardless, the diameter 35 of the accent region 18 leaves a suitable margin for sealing edges of the formable layer 16 together.

Another feature or significant utility to the diameter 25 is to identify the placement of a medicament. By providing a target region 18, the accent region assists in positioning a medicament to be folded up within the finished wrapper 20. Similarly, the accent region 18 may typically have a substantially different, typically contrasting, color with respect to the formable layer 16 or the principal edible 16. In this way, color coding may identify not only the target accent region 18, but also identify what flavor the accent region 18 contains.

In general, the width 36 or the overhang 36 of the film 14 is simply for convenience. That is, since a user, the pet owner, will need to lift the film 14 away from the base 12, and fold each wrapper 20 or each formable layer 16 into a wrapper 20 in sequence, it is important to be able to quickly grasp that film 14 or film layer 14, and manipulate it. Thus, an overhang 36 may be provided for that purpose.

Meanwhile, for convenience, the card 12 or base 12 may extend in the direction orthogonal to the extension 36 of the film 14. This provides a base slightly broader than the maximum dimension of the various array of wrappers 20 on the film 14.

Figure 2:
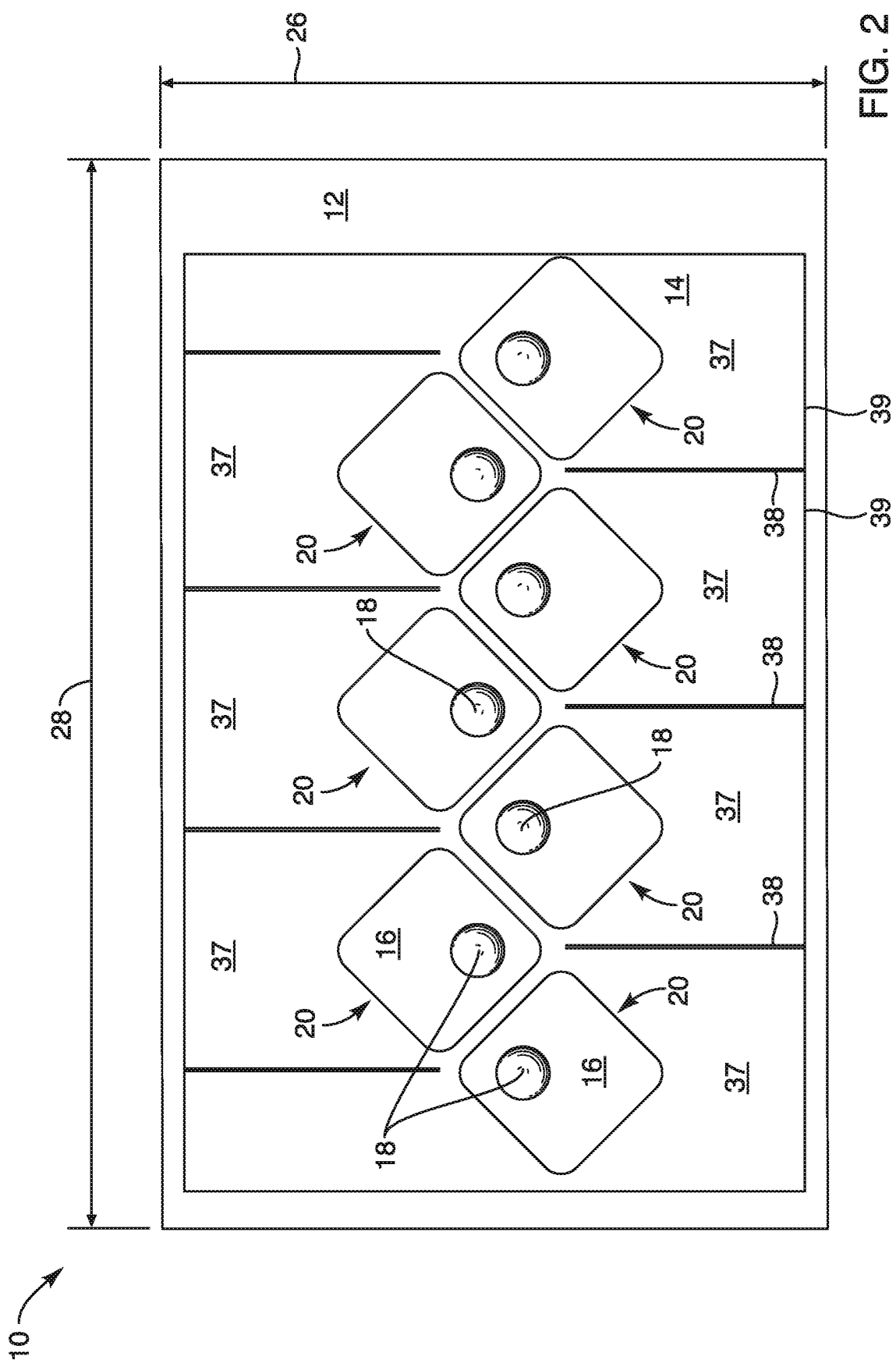
FIG. 2 is a top plan view of an alternative embodiment for a composition and system in accordance with the invention.

Referring to FIG. 2, while continuing to refer generally to FIGS. 1 through 18, in certain embodiments of a product 10 or system 10 in accordance with the invention, the width 26 and length 28 may be sized to accommodate a row of formable layers 16 or edibles 16 in a line or staggered. The staggered pattern is referred to here as the "Argyle" pattern because of the squares closely arranged in an adjacent diamond type of configuration.

In the illustrated embodiment, the film 14 is provided with a cut 38 or gap 38 between adjacent portions thereof. Accordingly, the film 14 may be folded laterally from one side of the base 12 toward the accent regions 18, all of which lie close together near the center of the longitudinal center of the base 12.

Again, the base 12 is offset from the edge 39 of the film 14. In this particular embodiment, each individual segment 37 of film 14 effectively operates independently of all the others. Accordingly, a pet owner may place a medicament on the target region 18 or accent region 18. The medicament may be pressed into the malleable or formable layers 16.

Thereafter, the film segment 37 may be folded over, bending the formable layer 16 along a central diagonal to close into a tart-shaped triangle. Pressing down on the film 14 molds the upper edge and lower edge together, thus enclosing the wrapper 20 around the medicament.

Some of the benefits of this configuration include its simplicity. Nevertheless, it does use more square area and more film 14 in the base 12. Nevertheless, it may be provided with any number of individual formable layers 16 or wrappers 20.

Figure 3:
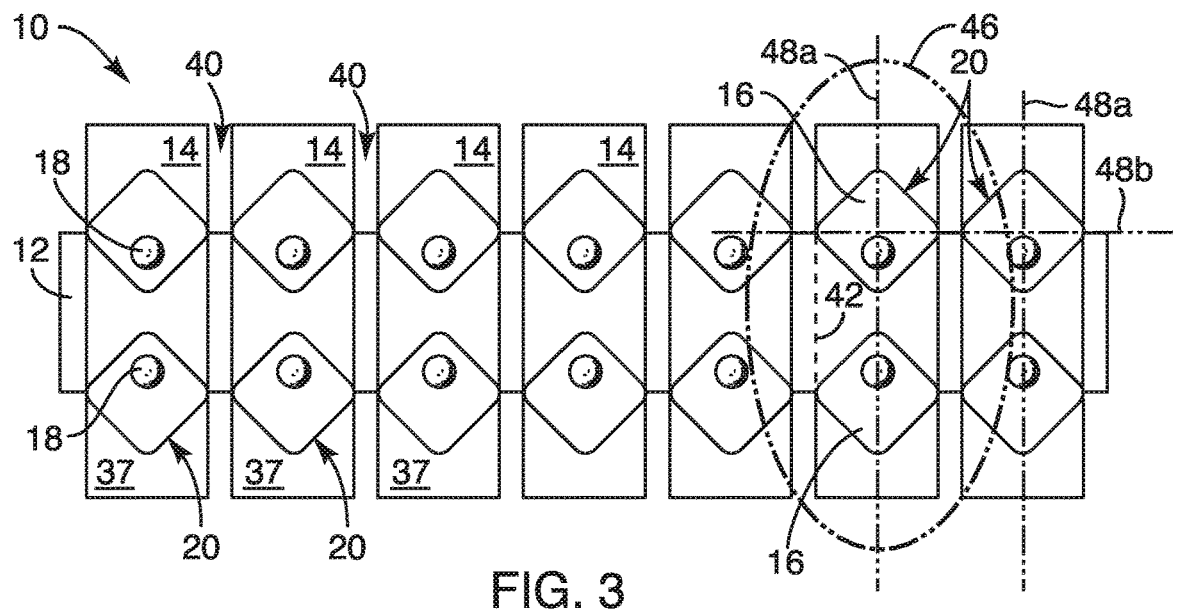
FIG. 3 is a top plan view of yet another configuration of a product in accordance with the invention.
Figure 4:
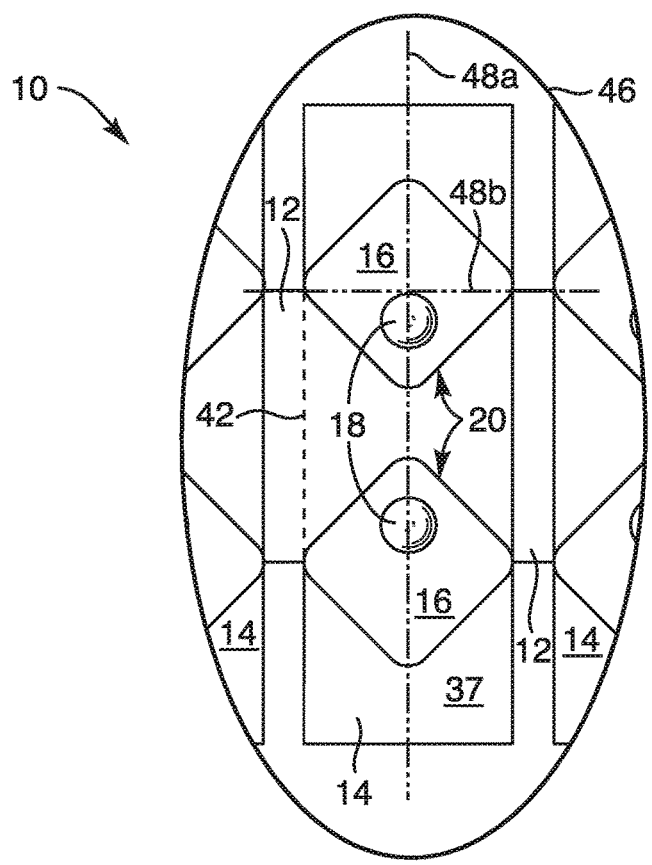
FIG. 4 is a detail of the composition and system of FIG. 3.

Referring to FIGS. 3 and 4, while continue to refer generally to FIGS. 1 through 18, an alternative embodiment of a product 10 in accordance with the invention may include an array of wrappers 20, each of which is supported on a segment 37 of film 14, but only partially supported by the underlying base 12. Thus, in this embodiment, the base 12 underlies the portion of each of the formable layers 16 or wrappers 20 that will serve as the bottom, receiving its opposite half pressed thereagainst.

Meanwhile, the film 14 underlies the complete formable layer 16, or wrapper 20. Film 14 and wrapper 20 may be lifted up and folded over the top of the portion thereof on the base 12. Thus, the smaller base 12 and strips 37 or segments 37 of film 14 may be fabricated and assembled. In this embodiment. A perforated line 42 or tear line 42 may provide a weakened location to tear off one or more pairs of wrappers 20.

For example, if a regimen calls for ten doses or two doses per day over five days, then a one-week-size base 12 may be cut off and the remaining wrappers 20 may be stored without the large empty base 12 with its overlying film segments 37. Similarly, the lengths may be arranged to a default size, or a totally optional selection between five days, seven days, ten days, and so forth.

In the illustrated embodiment, the longitudinal axis 48b and the lateral axis 48a through any particular wrapper 20 may be marked or unmarked. One advantage of marking the axis 48 is to demonstrate a fold line 48b. On the other hand, the accent region 18 may serve that function along with a brief instruction on a package.

It will be noted in the detail region 46 or the inset 46 that the segment 37 of film 14 extending away from the base 12 provides adequate length and width for gripping leading to easy manipulation of the wrapper 20 for folding. Meanwhile, plenty of clearance provides not only a grip without touching the "typically oily" formable layer 16, but also accommodating any deformation that may result from pressing one half thereof onto the other half thereof near the edges.

Figure 5:
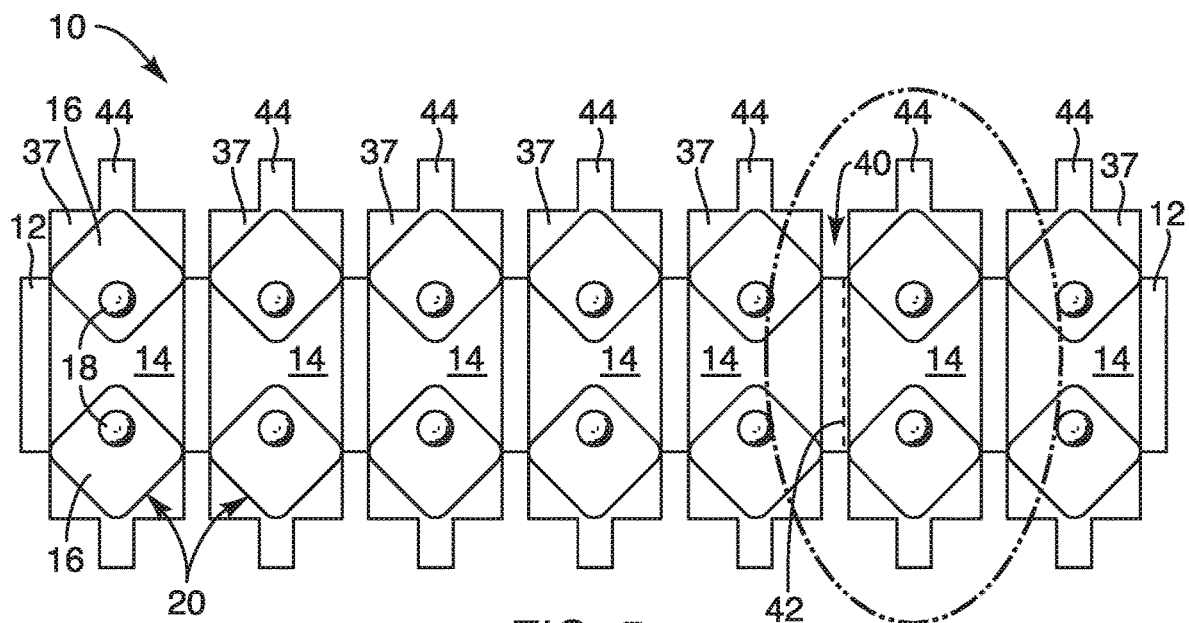
FIG. 5 is a top plan view of a different embodiment of a product in accordance with the invention, having individual tabs for lifting the underlying films under the compositions in accordance with the invention.
Figure 6:
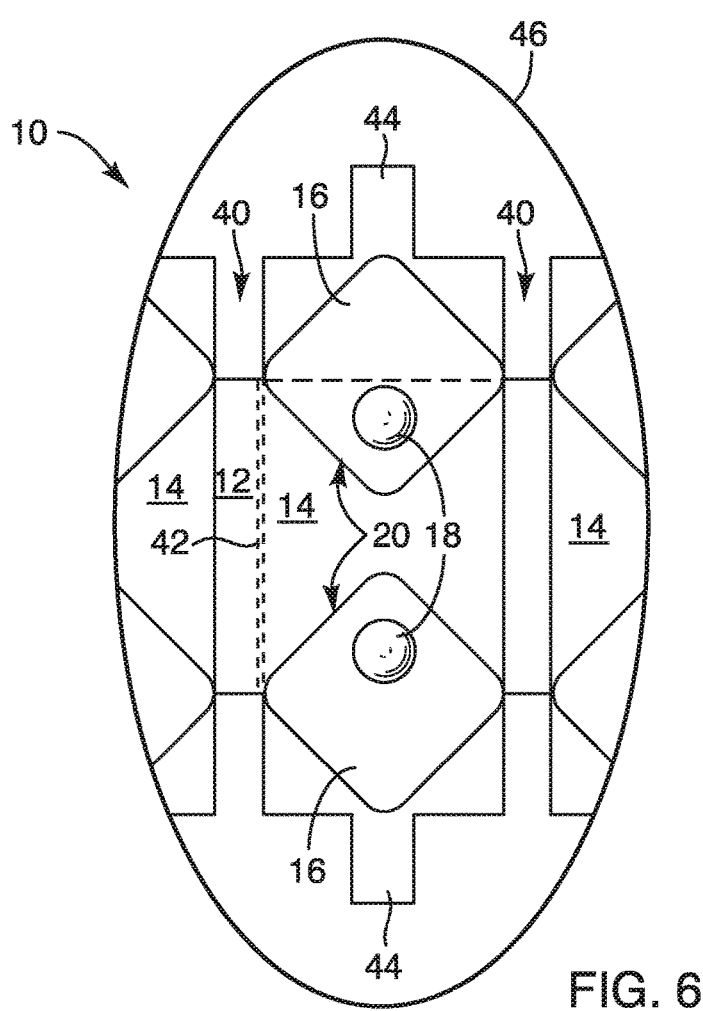
FIG. 6 is a detail view of a portion view thereof.
Figure 7:
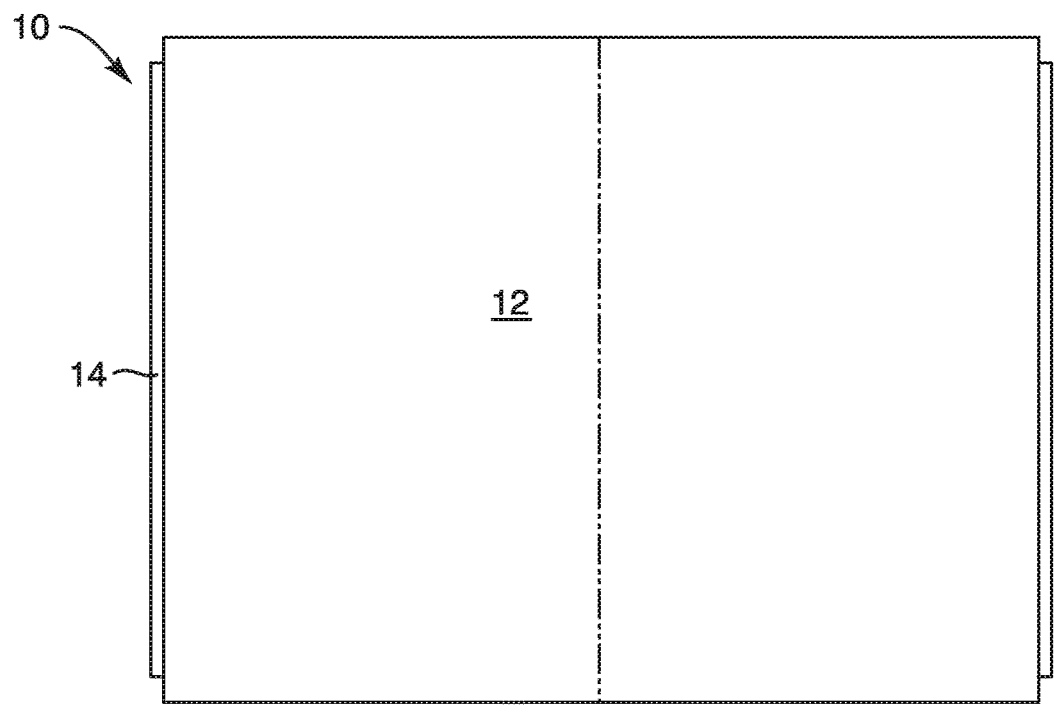
FIG. 7 is a bottom plan view, one embodiment of a product, system, and composition of FIG. 1.
Figure 8:
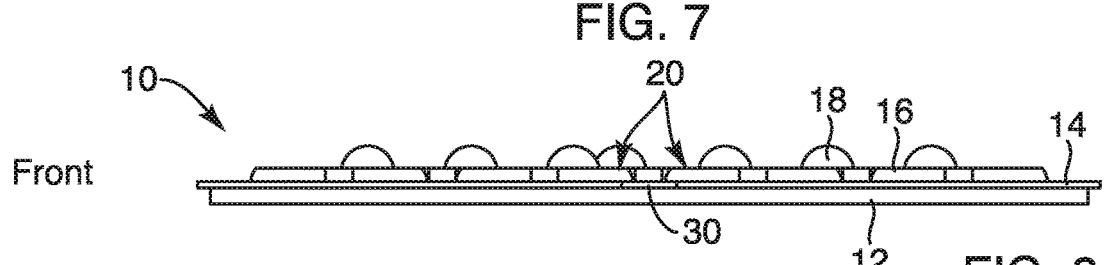
FIG. 8 is a front elevation view thereof.
Figure 9:
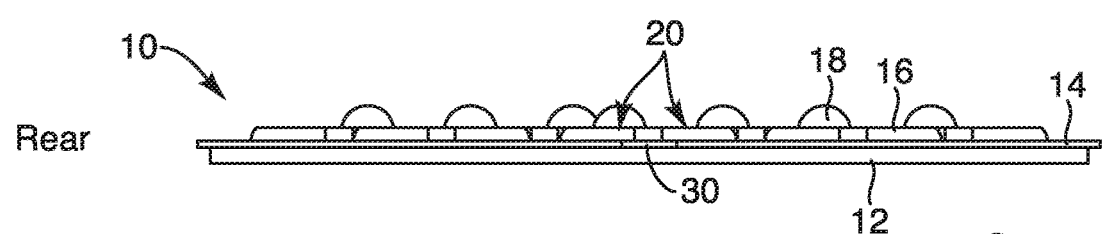
FIG. 9 is a rear elevation view thereof.
Figure 10:
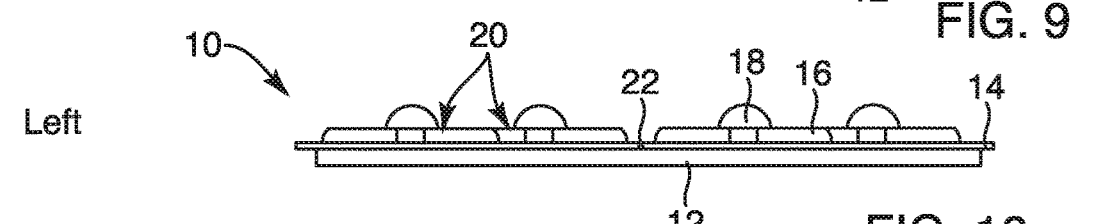
FIG. 10 is a left end elevation view thereof.
Figure 11:
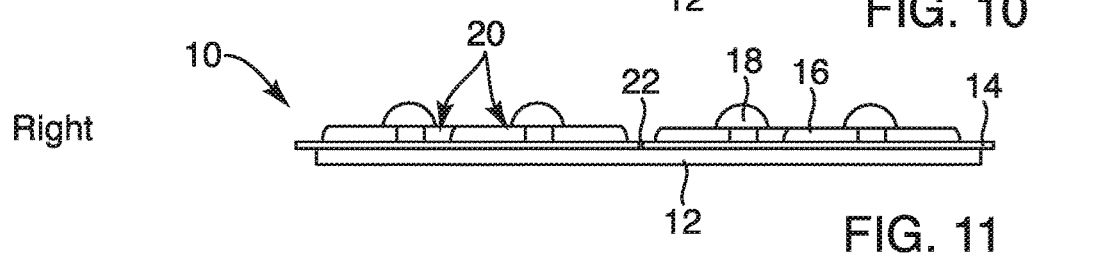
FIG. 11 is a right end elevation view thereof.

Referring to FIGS. 5 and 6, while continuing to refer generally to FIGS. 1 through 18, an alternative embodiment provides less of the film material 14, but sufficient to cover each of the wrappers 20 or formable layers 16 during folding. In this embodiment, the tab 44 serves as a grip location, providing for lifting of each segment 37 of film 14 upward suitably for folding the formable layer 16 over on itself.

One will note that any of the details of shape of the tab 44 may be selected to be arbitrary or to be intentionally shaped for functionality. For example, a rectangular shape as illustrated may be replaced by a more smoothly curved shape that is easier to manufacture, having no sharp outer corners or sharp inner corners.

In fact, the tabs 44 need not even be centered with respect to the wrapper 20 being folded. Instead, since the tab 44 is simply a convenience for taking hold of the film 14, and particularly a particular segment 37, if it is eccentric or non-symmetrical, this should present no problem. So long as the film 14 still completely supports the formable layer 16, wrappers 20 may be folded easily.

One advantage of having a curved edge, such as an S curve cut in the film 14, or a series of cuts that repeat with every particular segment 37 is economy. The film 14 may be cut continually with no waste.

In general then, many of the features and benefits found in the embodiment of FIGS. 3 and 4 are also replicated in FIG. 6. Nevertheless, the shapes of tabs 44 may be made more functional, more economical, or informative. For example, the cut around the periphery of each tab 44 may be the shape of a trademark logo or the like.

Referring to FIGS. 7 through 13, while continuing to refer generally to FIGS. 1 through 18, an embodiment illustrated in FIG. 1 is shown in additional detail. In this "Argyle" layout or pattern, the typical views, including all of the orthogonal views plus a perspective view illustrate the layup or appearance of one embodiment of a product 10 containing an array of wrappers 20. For example, the formable layer 16 of each individual wrapper 20 may be deposited on the film 14 by any suitable manner.

Typically, a press, a cutter, or the like may roll and form each of the individual wrappers 20. These may be deposited, during or after formation as the layer 16 of edible 16 on the film 14. Typically, one might expect the base 12 to underlie the film 14 during fabrication or assembly of the product 10.

However, in the embodiment of FIGS. 3 through 6, it may be advisable not to do so, due to alignment and adhesion that may be harmed by having a disparate distance between the portion of the film segment 37 overlying the base 12, and that not overlying the base 12. Of course, manufacturing machinery may be designed to provide relief to receive the base 12, and so forth. Nevertheless, one advantage of having a region or receiving the formable layer 16 on top of the film 14 on top of the base 12 is advisable for ease of manufacturing.

In certain embodiments, the accent region 18 may simply be a portion of the formable layer 16. In other embodiments, as illustrated, the flavor burst 18 or accent region 18 may be a region of a separate material, or a separately flavored material distinct from the formable layer 16 and placed thereon.

The accent region 18 may be deposited on the formable layer 16, or may be pressed into it, becoming one with it, and displacing a certain amount thereof. This may be done by a machine dropping a droplet or dosage of the flavor burst 18 onto the formable layer 16, followed by a presser foot flattening all together. In another embodiment, a presser foot may come down on the formable layer 16. It may effectively inject and contain the flavor burst 18 into the formable layer 16.

Typically, if the formable layer 16 is formed cold, or at approximately room temperature. Then adhesion may be adequate and distortion or flow tolerably small. In other embodiments, the formable layer 16 may actually be formed hot on the film 14, and later cooled. Thus, according to the formulation of the flavor burst 18 and the formable layer 16, an adhesion therebetween, and adhesion between the formable layer 16 and the film 14 may be engineered to be acceptable for manufacture, packaging, and shipping. It should also being suitable for separating the wrapper 20 from the film 14 for serving to a pet.

Figure 12:
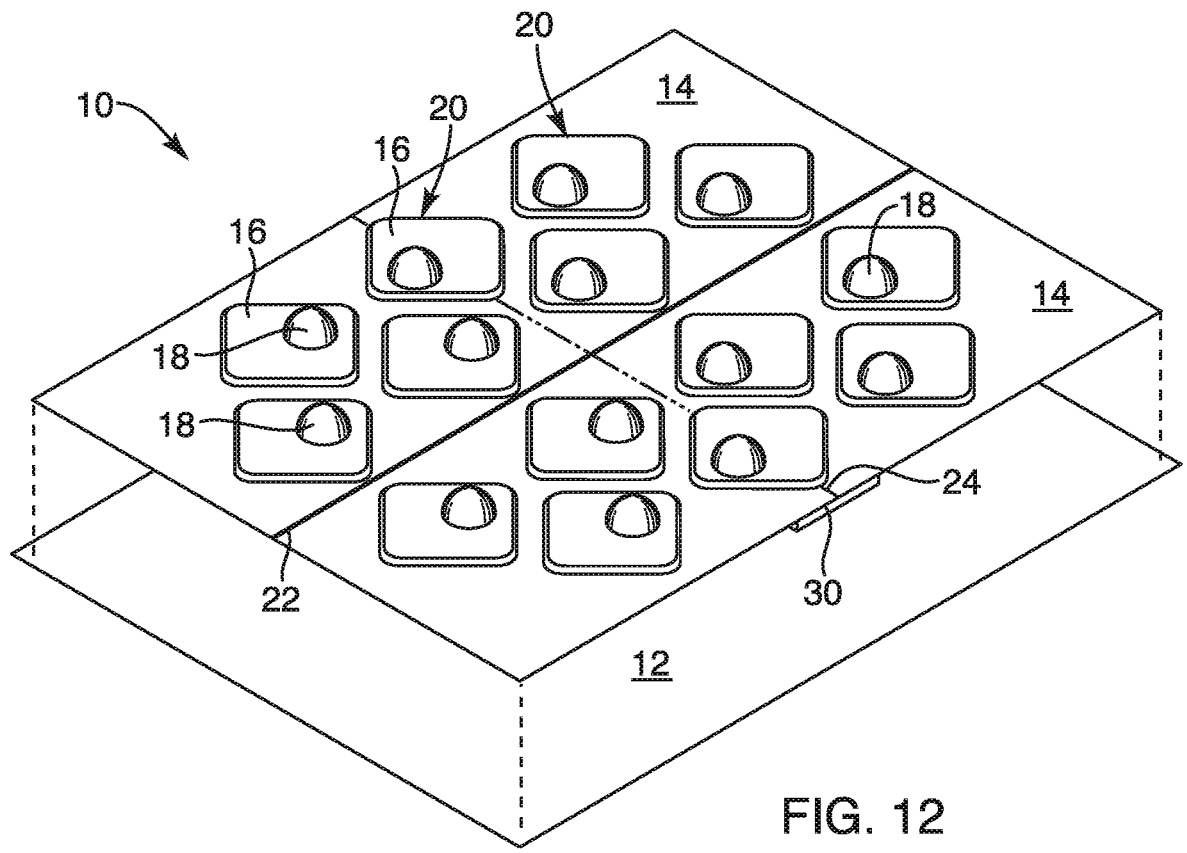
FIG. 12 is a perspective, exploded view thereof.

Referring to FIG. 12, while continuing to refer generally to FIGS. 1 through 18, one will note that this exploded view shows various components of the product 10 separated from one another. A mechanical fastener, such as stitching, bonding, an adhesive layer 30, or the like may secure the film 14 permanently to the base 12. One valuable function of that adhesive layer 30 is to maintain registration between the film 14 and the base 12.

Stability is important during manipulation of the wrappers 20 by a user (pet owner). In this embodiment, one can see that the folding of the film 14 will be longitudinally, or along the longitudinal axis, and folded along a line diagonally through each wrapper 20, and parallel to the center line 24. As described hereinabove, the center line may suitably pass diagonally through selected ones of the wrapper 20.

The bonding or fixing of the film 14 to the base 12 occupies only that portion of the film to the left, in the illustrated embodiment, of the center line 24. Under that specific selection of wrappers 20, it will not interfere with the folding of the film 14 over that particular wrapper 20.

Figure 13:
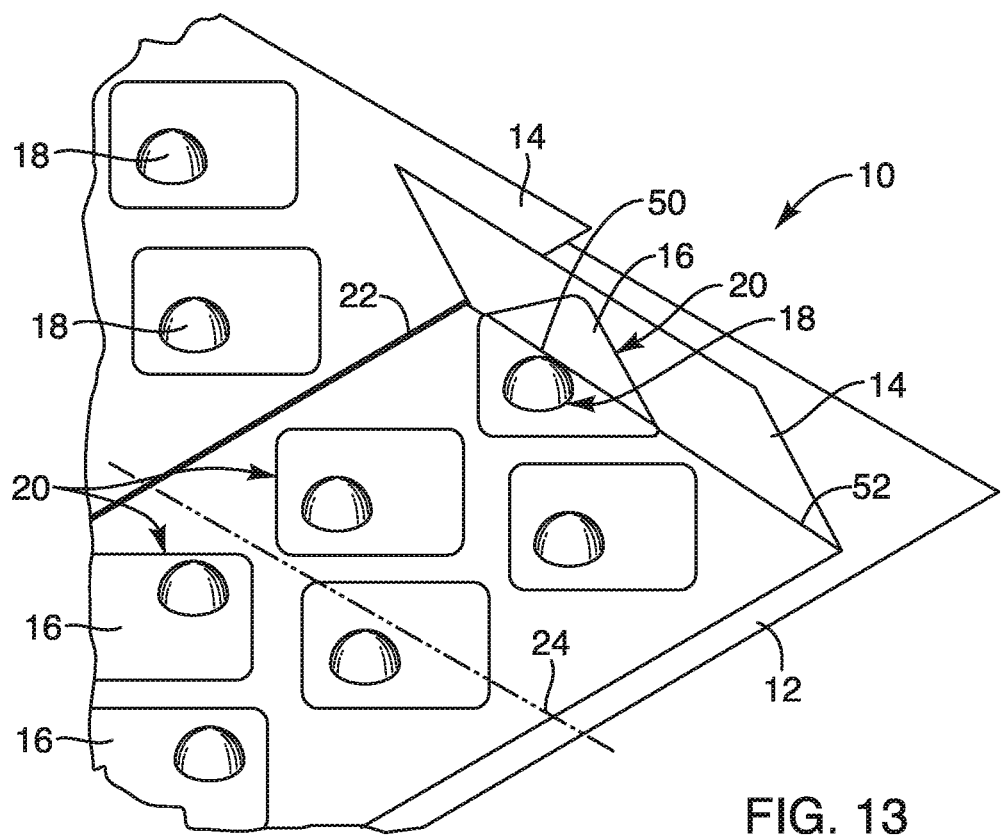
FIG. 13 is a perspective, assembled view of a portion thereof, in operation, illustrating the folding over of the film to enclose a medicament, pill, capsule, tablet, or the like therewithin.

Referring to FIG. 13, one may see how, for example, over the first or end wrapper 20, a medicament 50 may be placed on the accent region 18. The fold line 52 passes diagonally through the center of the particular formable layer 16 or wrapper 20. Thus, one can see how the square or diamond shape that is the wrapper 20 is formed into a more-or-less triangular shape sandwiching the medicament 50 between the halves of the wrapper 20.

In selected embodiments, the film 14 may be selected from several suitable candidates. For example, polyethylene adheres suitably well to inherently adhesive materials. Labeling of polyethylene bottles uses an adhesive bond to form a mechanical attraction. In contrast, polyethylene is impervious to most chemicals, and does not, therefore, form chemical bonds with most other materials.

Polyethylene, such as low density polyethylene (LDPE) is available for bags and other packaging for retail products. It is comparatively soft, flexible, and may be fabricated in a variety of thicknesses. In certain embodiments, the thickness may be less than about six thousandths of an inch, or about six mils. A thickness on the order of about three mils is a good target number. On the other hand, more stiffness and therefore more rigidity within the plane of attachment to the base 12 may benefit the system 10 or product 10 in certain cases.

For example, a one mil or two mil thickness of the film 14 would be so very flexible as to tear easily, and tear away from any adhesive layer 30 or from stitching to the base 12 or the like. Such a film 14 would be very flexible and easily folded. However, it would not present nearly the stability contemplated for the film 14. A thickness of about ten mils would provide a rather robust film 14, foldable, yet returning to a flat configuration on the base 12 when released.

In yet another alternative material, polyethylene terephthalate is sold under the trademark of MYLAR®. This particular plastic tends to be quite rigid in the plane of the plastic, but yet quite flexible orthogonal to the plane. Thus, it is suitable for bending and folding along a fold line 52, yet is comparatively stiff and coplanar with the base 12. Again, thicknesses may be selected from about one mil to about ten mils. A range of about three mils to about five mils is a suitable target thickness.

Other plastics, including polypropylene may also be used. Even expanded polyethylene (ELDPE) as a foam layer of film 14 may be suitable. Similarly, other expanded polymers may also serve. However, expanded polystyrene, sometimes sold under the trademark of STYROFOAM™ is typically not flexible enough to tolerate the bending required in accordance with the invention.

In other embodiments, the film 14 may actually be paper, such as treated paper, plastic-coated paper, polyethylene-laminated paper, waxed paper, parchment, or the like. In certain embodiments, the film 14 may actually be an edible or dissolvable material, such as a gelatin sheet, or the like. In some of the embodiments, the film 14 may be torn off after use. Nevertheless, in the illustrated embodiments, there is no necessity to dispose of the film 14 or the base 12 until all of the individual wraps 20 have been used.

Figure 14:
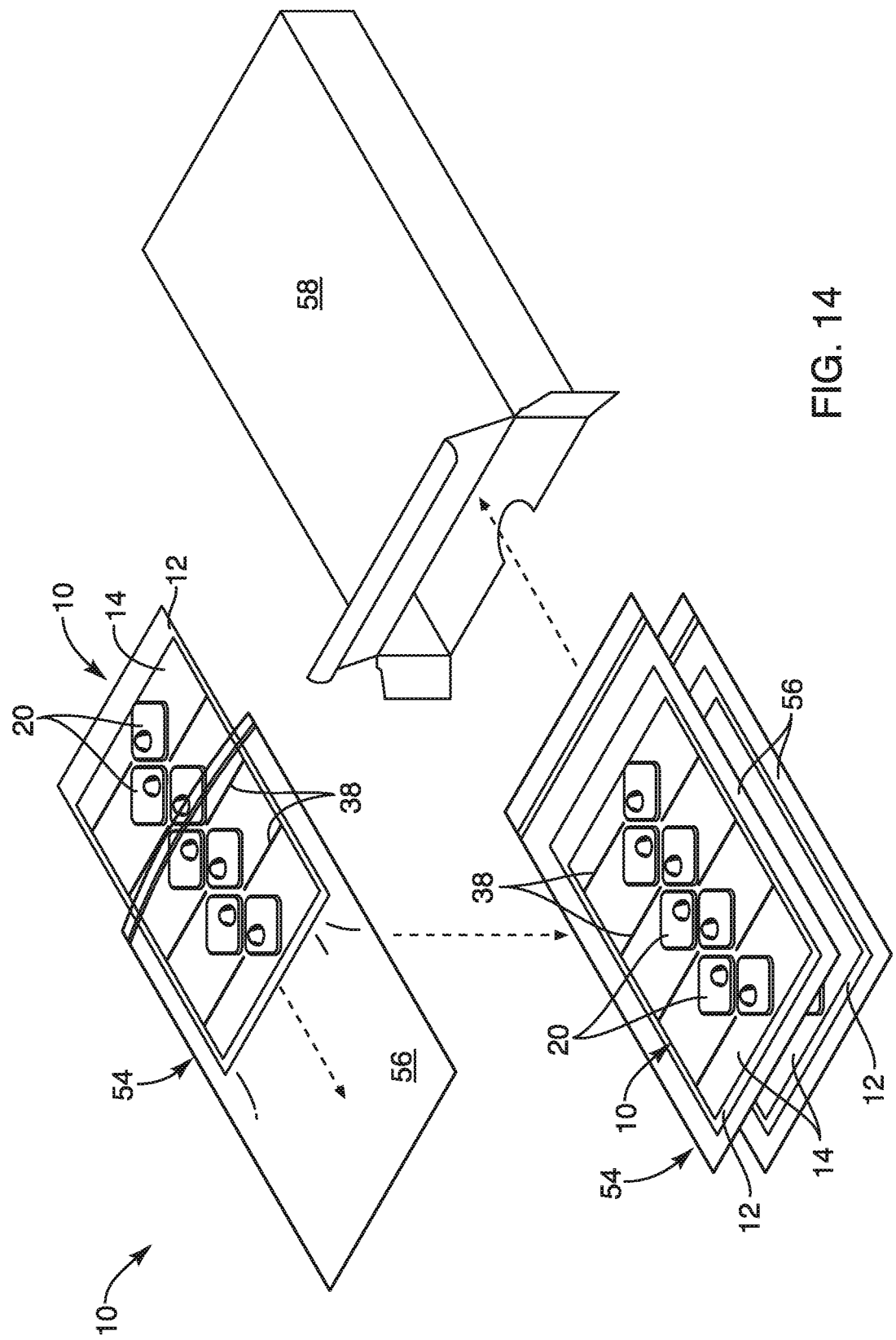
FIG. 14 is an exploded, perspective view of one alternative embodiment for packaging a product and composition in accordance with the invention, this illustrating the card and film configuration of FIG. 2, but equally applicable to the other alternative embodiments illustrated herein.

Referring to FIG. 14, each of the illustrated embodiments hereinabove may be packaged in a pouch 56 or cover 56. In some embodiments, a layer of foil may be adhered to the base 12 to be peeled away therefrom. This would provide for covering each of the individual pieces 16 or formable layers 16 prior to use. In other embodiments, an additional layer of film, such as low density polyethylene may be spread over the wrappers 20 and peeled back for use. In other embodiments, the cover 56 may simply be a zipper-type, re-sealable bag such as is ubiquitous in the packaging industry.

Such bags 56 may be formed in a continuous process, be cut and sealed into individual widths, and based on a particular thickness and length of material having the zipper seal already bonded before the bags 56 are cut. By whatever mode, a covering 56 or bag 56 may form with its contents a packet 54 containing a base 12, a film 14 fixed thereto at least along a central portion, such as near a center line 24, and presenting an array of the wrappers 20 thereon.

Each individual cover 56 or bag 56 may be left sealed until use. A group of packets 54 may be assembled in a carton 58 or box 58 sized to a convenient number of wrappers 20 for use. For example, one card 12 or base 12 may contain a regimen for a single ten day course or a single one week course of treatment. Alternatively, one card 12 or base 12 may contain an array of wrappers 20 sized for half of a single course.

Again, the bag 56 or other cover 56 may be sized according to the particular layout desired. This may be a grid, on parallel lines, or in an offset "Argyle" pattern of diamond shapes as illustrated hereinabove. The carton 58 may be sealed against tampering or available for opening for inspection. In the latter event, the bags 56 may include tamper-proof sealing such as bonding foil to the card 12, or other substrate 12, providing a sealed portion of each bag 56, or the like before it will permit access to its zipper feature.

A treatment pack packaging various wrappers 20 may be sized and counted in packets conforming to the number of doses of a medicament to be administered during a length of treatment. For example, certain antibiotics are administered morning and night over a period of about ten days. Thus, two pills, capsules, tablets, or the like are administered per day over a period of ten days. Thus, one embodiment of a product 10 may include a substrate 12 containing a film 14 on which are disposed wrappers 20.

In the "Argyle" configuration discussed above, these may be compactly oriented in multiple rows, each impinging on the interstices of an adjacent row in order to form the courses of a treatment regimen. Thus, a user (pet owner), may visually determine how many wrappers 20 and therefore how many doses of the medicament have been used during one course of treatment, and how many remain. The purchasing consumer may thereby see if a dose has been forgotten.

A one week regimen or a ten day regimen is typical. Other regimen lengths, or number of doses, as represented by corresponding numbers of wrappers 20 may be provided. Meanwhile, because of the need for folding without touching the work surface, counter, table, or the like a substrate 12 is stiff. It is sufficiently stiff to conduct the folding operation of the film 14 around the formable layers 16 to form the wrappers 20.

One may create thereon with the film a wrap 20 in the closed or sealed configuration while the underlying work surface remains clean. Meanwhile, the remainder of material forming the formable layer 16, whether a paste, thixotropic material, solid, flexible layer, or the like may remain in place on the film 14 until used.

Also, the substrate 12 provides something to draw out of a package and otherwise manipulate, move, transport, or handle the array of wrappers 20 corresponding to any course of treatment. All of the materials and identified hereinabove are recyclable, some may be edible, and most may be biodegradable.

Of course, advertising, messaging, instructions, and the like may be preprinted on the film 14, the base 12, or both. In some embodiments, an additional layer of film may overlie the formable layer 16 of discrete wrappers 20. This may contain instructions, warnings, labeling, advertising, or the like.

A flexible film 14 is secured to remain with the substrate 12. It should fold away from it or lift up from it and fold over a wrapper 20 to seal a medicament therewithin. The alignment and count for the daily doses corresponding to the wrappers 20 are easily viewable by the administering pet owner. Meanwhile, fingers, fingertips, nails, and the like remain free of the material forming the formable layers 16. Thus, even if the principal material of each wrapper 20 is a paste, there is no forming of the paste, no manipulating of it other than the folding of a discrete wrapper 20 thereof separated from the user by the layer of film 14.

The flavor burst 18 or accent region 18 is useful as a visual identification of the flavoring contained therein. Likewise, it provides a designation of the location on which to place the medicament being administered. The patient (animal, pet) receives from the flavor burst 18 a burst of scent, flavor, or both. This may be accentuated by putting the flavor burst 18 as an accent region 18 reaching completely through or into the outside surface of a formable layer 16.

In the illustrated embodiment, the flavor burst region 18 or accent region 18 is shown as a circle. However, this may also be configured in other suitable shapes. Also, it may have appendages beyond its major extent, even extending to the edges of the wrapper 20. It may designate by its major area the location where medicaments should be applied, and yet carry by the appendages thereof the accent of flavor to the sealed edges.

Another benefit to the diamond shape is that sufficient paste is available to fold over and cover any size of tablet or capsule, or even multiple doses or pills. Nevertheless, the layer 16 need not be particularly thick, because it is formed to be flexible and supported by the film 14. Unlike prior art systems, it need not ever be free standing. Thus, it may actually be molded further after being wrapped over the medicament and sealed. Thus, there is sufficient formable material 16, such as a paste or flexible layer 16 yet no need for waste as the thickness and width 34 are predetermined and preformed during manufacture.

It is contemplated that at least two sizes, for larger animals, such as large dogs, and for smaller animals such as cats or small dogs may be fabricated. Various ingredients may be selected to render the wrappers 20 flexible and sufficiently strong. Organic ingredients may, include meals, grains, meats, oils, vegetable matter or the like. Freedom from undesirable or undesired materials may be provided in the composition of the formable layer 16. Typically, an oil will be selected that will absorb into the solid materials of the formable layer 16, hold the shape, sustain the flavor, and provide ready distribution of the aroma thereof.

In the illustrated embodiments, the presentation of the product 10 is flat. Likewise, it is intended to correspond with the course of treatment by count, and size of the commonly available prescriptions. It has been found that the flat configuration of the wrapper 20 makes it easily manipulatable through the film 14. It creates a sufficiently thin layer to be flexible, and readily foldable and moldable around the medicament 50 contained therein.

Specifically, the wrappers 20 are not preformed in some container like configuration. They are not left to be freely contacting one another. They need not be dug out from some bulk container. There is no reaching into a bag and receiving a thorough slathering of grease or oil on hands, knuckles, and fingers while one seeks to select and withdraw a single dose of a wrapper 20. By using the cards 12 or other substrates 12, a sealing container 56 or bag 56 allows the card 12 to be drawn out and replaced repeatedly.

Meanwhile, with the substrate 12 withdrawn from the bag 56, the wrappers 20 may be individually served with a dose of the medicament 50 and folded over to seal it. The only contact a pet owner need have with the wrapper 20 is to draw it, in its folded configuration containing a medicament 50, away from the film 14 and deliver it to the animal. The edges of the plastic film 14, illustrated in various configurations may be drawn over a specific wrapper 20 in order to contain the pill, tablet, and capsule, on the target area 18 or accent region 18, followed by sealing of the edges of the triangle.

A significant benefit is that only one hand is required to place a medicament on the formable layer 16, a specific wrapper 20. That hand need never touch the closed wrapper 20 or the wrapper 20 in the closed configuration. The film 14 prevents transfer of any residue of the medicament 50 onto the outer surface of the wrapper 20. Even if the hand that touched the medicament 50 is the same one that folds over the wrapper 20 and seals it, it is still separated by the film 14 from the formable layer 16.

Meanwhile, the other hand may be used to stabilize the substrate 12 or hold it in place while manipulating each wrapper 20. In turn, the other hand may then be used to remove the wrapper 20 in its folded configuration from the film 14 and administer it to a pet. The effect of this approach is that there need be no residue of the medicament 50 on the outside surface of a wrapper 20 in its closed configuration to be detected and thus refused by a pet.

Thus, the smell, flavor, size, texture, and so forth of each wrapper 20 in the closed configuration represents a treat to the pet, and is readily accepted and swallowed. Meanwhile, work surfaces remain clean, the folding process is supported, and the medicament is separated at all times from the outer surface of the wrapper 20 as administered, and so forth.

In some embodiments, the substrate 12 may be formed of paper, a comparatively stiff paper, fiber board or cardboard, even a corrugated cardboard. If deemed desirable, the substrate 12 may be coated with a food grade plastic film that does not separate therefrom. This may be applied as a coating, a lamination, a spray, a cured polymer, applied as a liquid and bonded by heat or reaction, or the like.

The configurations illustrated benefit from a substrate 12 that is sufficiently stiff that will not bend in the package nor in use. Meanwhile, the rectangular format provides left, right, forward and rear edges that provide alignment for the diagonal across each of the diamond-shaped wrappers 20. Thus, even if pressure is supplied or is applied to the film with fingers under the substrate 12 and fingers on the folded film 14, the substrate 12 may be sufficiently stiff to support the loads. A surface or hand can be used to back up the substrate 12.

The various configurations provide for lifting and folding the film 14 in order to fold each individual wrapper 20. The various cut lines 22, 38, as well as gaps 40 provide manipulation of individual wrappers 20 without any influence on neighboring wrappers 20. The arrangement of certain configurations, such as that of FIG. 1, permits separation of two different strips of wrappers 20, in each of which the arrangement of the wrappers 20 is such as to only involve one wrapper 20 at a time in its own folding, with no influence on adjacent wrappers 20.

The system 10 in accordance with the invention provides a measuring system for identifying the day, week, or regimen. Likewise, every dose is identified in advance and determinable by a user at a glance. Any absent wrapper 20 at a given location indicates the dose as been administered.

In contrast other products include a bag full of treats or a tub of a paste. The cohesion of the edible material 16 disrupts and destroys a certain amount of the product. Meanwhile, two hands become required to separate a single wrapper 20. Structural integrity is often poor, and the vagaries of humidity and temperature often cause groups of discrete pieces to bond together sufficiently thoroughly that they cannot be separated without damage or waste. By the same token, such bulk configurations as bags of treats formed to receive pills provide no measurement device, no tracking, no reminder, and, in some instances, colossal waste.

In certain embodiments, one will note that adjacent rows provide for a morning application and an evening application. Thus, one may tell which side, left or right, or top or bottom of a substrate 12 is the morning row and which is the afternoon or evening row. Thus, one may tell whether a specific dose was missed on a specific day, and at a specific time.

Although the "Argyle" pattern may have additional cuts placed in it, each row on the adjacent sides of the cut line 22 may be for a different time of day. For example, the upper, top, or right side of the substrate 12 may have the morning dose, while the opposite side on the other side of the cut line 22 carries the evening dose. Thus, the array on each portion of the film 14 on opposite sides of the cut line 22 represents a time of day and a day. For example, FIG. 1 shows the morning dose and an evening dose for a course of seven days. A course of ten days for a conventional antibiotic may also be configured in this way.

It has been found that the diamond shape provides symmetry to assure proper coverage of the pill or multiple pills placed on the accent region 18. Meanwhile, the oil content provides freshness of aroma and the absorption of the flavors compounded into the formable layer 16. The formable layer 16 may be formed in place, or extruded as a layer that is cut and dropped onto the film 14. It is contemplated that the same ingredients greens and coloring may be used for various flavors of the formable layer 16. The flavor burst 18 or accent region 18 may provide for the distinctive flavor of each type. Thus, a suitable flavor such as fish, peanut butter, cheese, vegetable, beef, chicken, or the like may be represented by the accent region 18, while the edible 16 or the formable layer 16 remains the same from type to type.

Of course the accent region 18 serves several purposes, including color coding for the flavoring, placement template for the medicament 50, and its chemical burst of flavor, aroma, or both. If the accent region 18 or dot 18 illustrated rises above the top surface of the formable layer 16, then the medicament 50 will tend to compress into it. This may displace a certain amount of it through the formable layer 16, or into the formable layer 16, thus making it more accessible from the outer surface. However, this also further masks and prevents the flavor or smell of the medicament 50 from transferring to a location on the outside surface of the wrapper 20 in the folded configuration.

Figure 15:
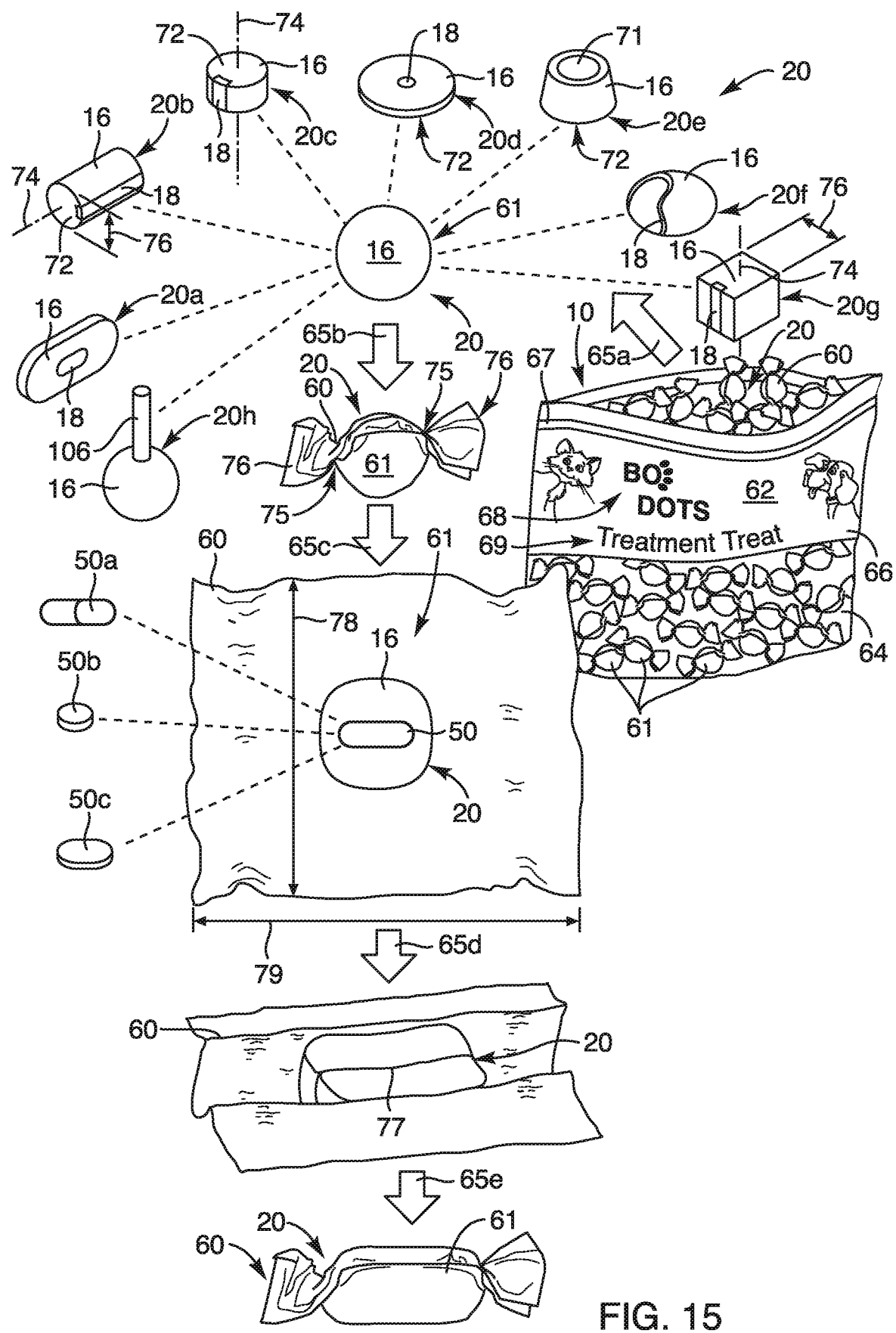
FIG. 15 is a schematic diagram of a process for using a medicine wrapper in accordance with the invention, and illustrating various embodiments of such a wrapper.

Referring to FIG. 15, while continuing to refer generally to FIGS. 1 through 18, in one alternative embodiment of a wrapper 20 in accordance with the invention, wrappers 20 may be individually "foiled" in isolation from one another. For example, a cover 60 such as a twist wrap 60 may be embodied in a plastic film, foil, paper, treated paper, or some combination thereof.

For example, covers 60 may include aluminum foil adhered to cellophane or other plastic (polymeric) film. In other embodiments, foil may adhere to paper. In other embodiments, paper may be treated with paraffin or other treatment to improve its durability, sealing ability, or the like Likewise, the cover 60 or foil 60 may literally be aluminum foil or the like. In general, one presently contemplated embodiment that provides many benefits is a twist wrap 60 or twist wrapper 60 of any suitable sheet material such as may be used for packaging individual servings of candies.

Herein, the cover 60 may typically be referred to as a foil 60. Meanwhile, the process of covering with a cover 60 will be called foiling. This is to distinguish the cover 60 or foil 60 from the wrapper 20 which forms the medicine-hiding product 10 already described hereinabove as a wrapper 20. Thus, regardless of the type of a cover 60, it may be properly referred to as a foil 60 or twist wrap 60.

Moreover, the cover 60 may actually be applied by different mechanisms. For example, the food processing industry has developed substantial automation, a variety of packing materials, and the machinery for handling them. To this extent, such may be adapted for use with the wrapper 20. However, this is not a simple matter.

For example, the animal feed industry as well as the veterinary medicine industry have not typically been driven by the same requirements, needs, technologies, and processes. Therefore, individually wrapped treats for pets are not found on the shelves of pet stores and veterinary establishments. Rather, large numbers of articles are simply consolidated in a single bag, box, or plastic jar together. Accordingly, the materials 16 or edible materials 16 to be used as the principle component of the wrappers 20 will have their own difficulties.

For example, sugar provides a binding quality to many foods, including candy, medicines, and the like for human consumption. Sugar is not a recommended food constituent for animals. Thus, the material 16 forming a wrapper 20 to be wrapped about a medicament 50 must use different materials, and will necessarily have a different consistency, mechanical properties, and associated manufacturing processes.

In one currently contemplated embodiment, a bag 62 or other container 62 may include individual pieces 61 of a product 10. The product 10 may be visible as individually wrapped servings 61 of the wrappers 20 in foils 60 or twist wraps 60. The container 62 may typically include a windowed portion 64 through which the individual foils 60 with their content 20 may be seen.

The container 62, such as a bag 62, may also include a labeling portion 66. For example, a seal 67 may provide a re-closable container 62 on which a trademark 68 and a description 69 of the product 10 may be imprinted. Other images, colors, and the like to create a pleasant package 62 may be printed on the container 62.

In a first use, the bag 62 or other container 62 may be cut open, or otherwise unsealed. Zipper-type locking mechanisms may seal plastic bags 62. Accordingly, the sealed bag 62 forms an initial seal preventing the escape of the aroma of the wrappers 20 within their covers 60. The bag 62 may be provided at manufacturing. Thus, an upper edge of the bag 62 may be cut open, thereby allowing access to the product 10 inside, with re-sealing by the use of a seal 67, such as a zipper-type seal 67.

An isolated one of the wrappers 20 may be removed in its cover 60 from the bag 62. Within the cover 60 or foil 60 the actual material 16 of an individual wrapper 20 may have a molded shape that serves as a functional element of the wrapper 20. For example, the various wrappers 20a, 20b, 20c, 20d, 20e, 20f, 20g, and 20h are various example embodiments contemplated.

For example, the shape of the wrapper 20a is somewhat flat and elongated. It may be rectangular or may have rounded corners. In other embodiments, the wrapper 20a may be somewhat elliptical or otherwise rounded yet elongated. Similarly, various wrappers 20 may include accents 18 or flavor bursts 18 embedded therein or added thereto. Thus, the edible material 16 or the principal material 16 may be treated with a flavor burst 18 or accent 18.

This accent flavor 18 may be positioned to be on the inside or outside surface of the wrapper 20 once a medicament 50 has been added thereto. Each provides a different benefit. For example, some embodiments, a flavor burst 18 or accent 18 may be directly against the medicament 50, in order to further mask the medicament 50 at its location. In fact, the accent 18 may actually coat somewhat a medicament 50, thereby further masking directly any taste of a medicine 50.

Other shapes may include a cylindrical shape of the wrapper 20b. In this example, the cylinder 20b is actually somewhat elongated in its aspect ratio in that the length thereof is greater than the diameter thereof. In an alternative embodiment, the wrapper 20c has an aspect ration of length to diameter of less than one. That is, the height of the drum-like wrapper 20c is less than the diameter thereof.

Similarly, the disc wrapper 20d has an aspect ration of length to diameter much less than one. This wrapper 20d is substantially flat and may be circular as illustrated, or may take on one of the other shapes illustrated hereinabove.

Again, any particular wrapper 20 may or may not include a flavor burst 18. Thus, one may assume a particular accent 18 applied in a convenient location inside or outside or on the inside surface or outside surface of a wrapper 20 in use.

In one alternative embodiment, a wrapper 20e may have a flavor burst 18 or accent 18 inside the opening 71 or on a lower surface 72. In the perspective view shown, such an accent 18 is not visible. However, it will appear much as those of the wrappers 20a and 20d. In this embodiment, the wrapper 20 is shaped as a frustum of a cone. It has a floor, forming the bottom surface 72, but an opening 71 providing a location to receive a medicament 50.

Yet another embodiment may be a simple sphere as the wrapper 20f. In such an embodiment, an accent flavor 18 may simply be injected into a mold with the principal edible material 16. Thus, the accent 18 may simply be a chimerical shape or result in a chimerical shape as a result of filling a mold. Any of the illustrated shapes, may have an aspect ratio of height to diameter or height to effective diameter (hydraulic diameter is an "effective diameter," defined as four times the area divided by the wetted perimeter in the engineering art) greater or lesser than one.

Similarly, the example of cross-sectional shapes does not preclude cubes 20g or other cross-sectional areas. One advantage of regular shapes is the ease of manufacturing tooling. For example, the shape 20a, if the thickness is sufficiently large, may be manufactured by extruding. Meanwhile, the wrappers 20b, 20c, and 20g may all be extruded through a die as a straightforward cross section, even including the flavor burst 18 being extruded therewith.

An extruder, well understood in the engineering art, may express a cross-sectional shape axially along a central axis 74 of a particular shape of wrapper 20. Accordingly, a diameter 76 or effective diameter 76 may be defined thereby as an effective diameter 76 of the planar surface 72 perpendicular to the axis 74. In the illustrated embodiments, the shape of the planar surface 72 of any of these cross sections may be formed by a knife or other cutter automatically cutting into lengths the extruding cross-section shape.

Shapes like the disc wrapper 20d may also be extruded. However, other methods of molding, including platens, presses, and rollers may be better modes for manufacture.

Similarly, the shape of the frustum wrapper 20e as well as the spherical wrapper 20f may best be formed by a conventional "two-piece-cavity" mold. Various molding techniques exist and may be used for such shapes. One will note also that any of the shapes 20a through 20h may be formed in multiple layers as illustrated by example in the morsel 20f. Outer coatings may be of a similar material 16, a more firm coating, a flavoring agent, a containment agent, a sealant, a more moldable material 16 than the base material 16, or the like.

Likewise, a perfect cube, or any other rectangular parallelepiped 20g, may be formed by direct molding in a "two-piece" cavity, or by extrusion, and so forth.

The wrapper 20 is then foiled in a cover 60 or foil 60 as discussed hereinabove. One very suitable embodiment is a twist wrap 60 in which each of the ends is twisted to provide a neck portion 75 at which the overall foil 60 has been twisted into a very compact configuration. Meanwhile, the twisting of the neck 75 necessarily results in a flare 77 at the extremity or extreme edges of the foil 60.

The overall width 78 of a foil 60 will typically be something over three times the effective diameter of a particular wrapper 20. Likewise, the length 79 of a foil 60 needs to be of similar extent. Typically, a good and effective foil 60 should be on the order of about three and a half effective diameters of the individual wrapper 20 being covered. This provides for overlap since the circumference of a circle is pi times the diameter. More than three times the diameter is required for complete coverage around the circumference of a wrapper 20.

In order to provide for manipulation by a pet owner, without having to make direct contact with the wrapper 20, a foil 60 or cover 60 is more effective if it has a width of about three and a half effective diameters of the wrapper 20. Again, here, the wrapper 20 refers to the material 16 formed in a shape for handling. It is designed ultimately for receiving a medicine dose embedded therein and wrapped around by the wrapper 20. Meanwhile, wrapping the wrapper 20 requires another cover 60, defined herein as a twist wrap 60 or a foil 60, regardless of its material.

An individual wrapper 20, closed up in its foil 60, may be extracted from a bag 62 or other container 62 by a pet owner, and unwrapped as illustrated. The foil 60 may be open, unwrapped, but need not be completely opened. The objective is to expose the wrapper 20 of the suitable edible material 16 contained therein and embed therein a medicament 50. For example, a capsule 50a, such as a gelatin capsule 50a containing an effective ingredient, a tablet 50b, or some other pill 50c of some other shape and some other material, or both may be prescribed by a veterinarian.

The process for using the wrappers 20 continues by placing a medicament 50 or other medical preparation 50 on a wrapper 20. The geometry of the wrapper 20 will typically suggest to a pet owner a configuration and processes for forming the wrapper 20 to embed therein the medicine 50.

For example, the wrapper 20a, being somewhat flat with a comparatively small aspect ratio of thickness to diameter may quite simply be wrapped around a capsule or tablet. Similarly, the disc-like wrapper 20d may be similarly employed. In contrast, the more bulky configurations, such as the cylinder 20b or bar 20b, the drum 20c, the frustum 20e, the sphere 20f, and the cube 20g or other parallelepiped 20g may best serve by being kneaded or pressed. Being somewhat malleable they may receive a medicine capsule 50a, tablet 50b, or other pill 50c depressed directly thereinto.

The wrapper 20h may be similar to that of example 20f. However, a "stick" 106 may provide a handle 106 for grasping, as well as forming an aperture within the treat material 16 (composition 16). The stick 106 may assist in wrapping, as well as in manipulating the wrapper 20h. For example, the stick 106 may be used to force a medicament 50 into the aperture remaining upon its removal from the material 16.

Ultimately, a thumb and forefinger, or thumb and any opposing finger, may compress and deform the wrapper 20 around the medicament 50. The result will typically be a joinder 77 or seam 77 wherein the material 16 of a wrapper 20 has been deformed around the treatment 50 (e.g., capsule 50a, tablet 50b, other form of pill 50c or the like) sealing it therein.

One may think of the various steps starting with extracting 65a a foiled pill wrapper 20 from a container 62. The wrapper 20 was previously foiled 65b meaning wrapped 65b, or twist wrapped 65b at a factory and placed in the foil 60 as defined hereinabove. A user then unwraps 65c, unfoils 65c, or otherwise exposes 65c the wrapper 20 for embedding 65d the medicament 50 therein.

Again, all the medicaments 50 may be referred to as a pill 50 regardless of their configuration. In fact, various other formulations or formats may include powders, liquids, granules, or the like. Ultimately, the wrapper 20 may then be delivered to a pet. A pet owner need not even touch the wrapper 20 at any time or any point. Rather, the cover 60 or foil 60 has provided sufficient area to protect the fingers and work surfaces against having to manipulate the wrapper 20 by direct contact.

In certain embodiments, a user may prepare a wrapper 20 in advance by re-foiling 65e, re-wrapping 65e, the treat wrapper 20 or pill wrapper 20 into its foil 60. Accordingly, a user can prepare several of the wrappers 20 in their foils 60 and drop them into a handbag or other container, such as a bag, glove compartment, console of a car, or the like, for later use. Thus, a user need not carry about the entire bag 62.

In that regard, the quantity of product 10 within a bag 62 may vary. Often, medicines provided to pets are indefinite in their extent. That is, older animals may have chronic conditions that require administration of pills 50 or other medicaments 50 on an ongoing basis, with no foreseeable end in sight. In some embodiments, the bag 62 may have a content of product 10 constituting some large number to be used over some extended period off and on as required. Thus, a supply of the product 10 is in the bag 62, and may be stored on a shelf, or in a refrigerator until some future time of need or between periodic times of need.

On the other hand, certain treatments may be periodic and run for a period of days only. Other medicines 50 may be administered for a period of several days or sometimes a week or two. It is well known that certain penicillin products run a course of about ten days, which time period is not to be shortened. Thus, a bag 62 may have a content sized or numbered to fit a particular standard regimen of three days, a week, two weeks, or the like.

Figure 16:
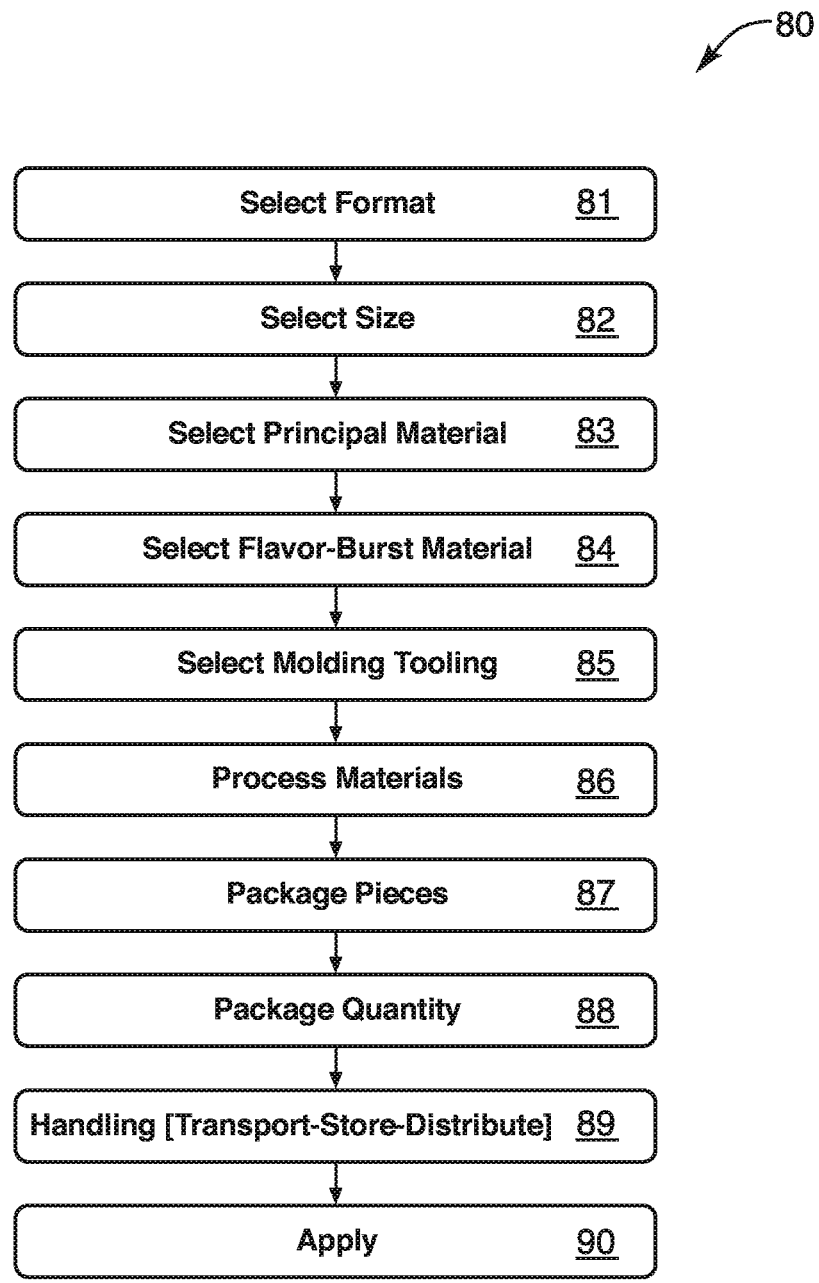
FIG. 16 is a schematic block diagram of a process for making and using a medicine wrapper in accordance with the invention.
Figure 17:
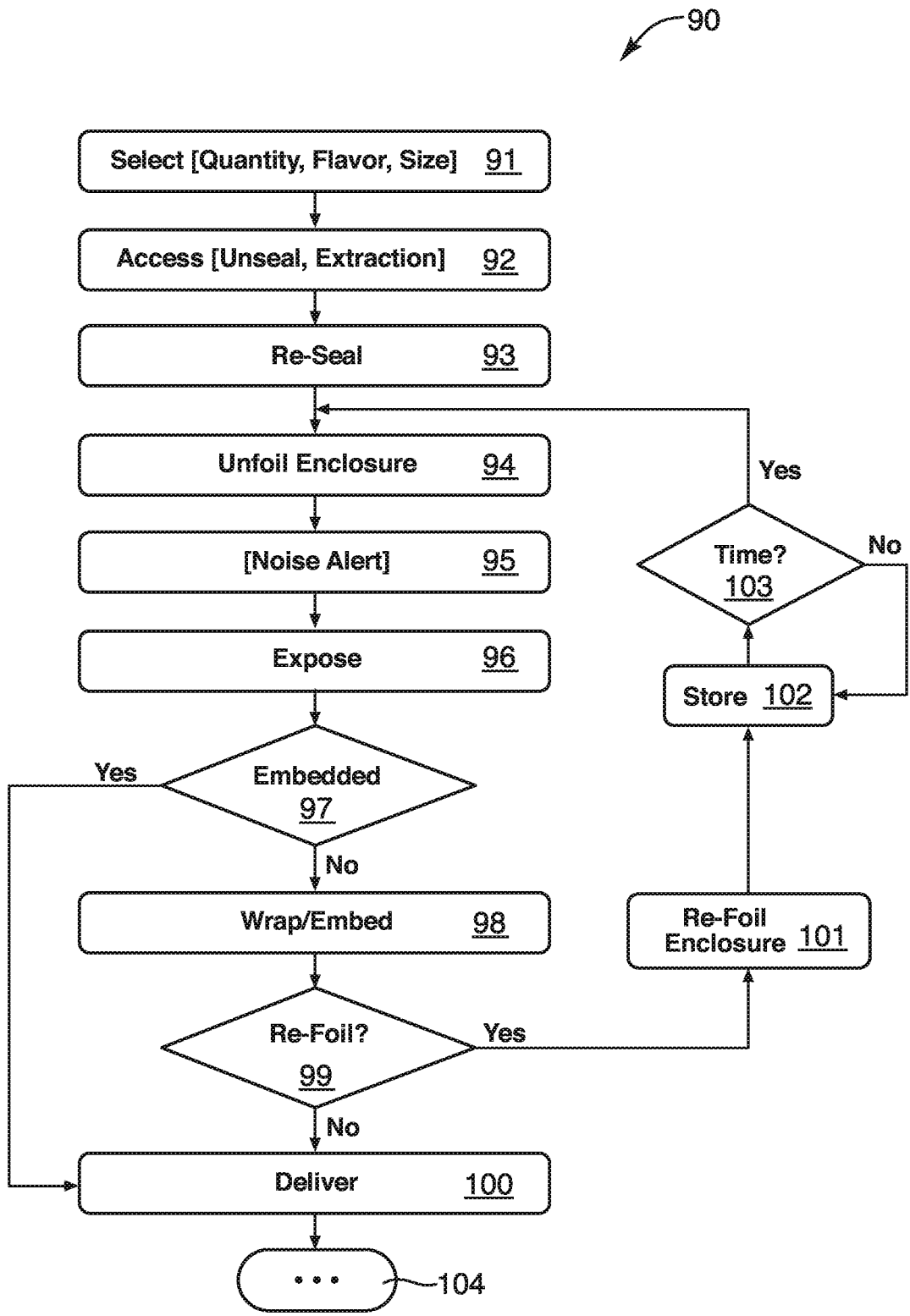
FIG. 17 is a schematic block diagram of applying or administering a "treat-wrapper" wrapped medicine dose in accordance with the invention.

Referring to FIGS. 16 and 17, while continuing to refer generally to FIGS. 1 through 18, a process 80 or method 80 for creating and providing wrappers 20 in accordance with the invention may involve selecting 81 a format. For example, the various embodiments 20a through 20g illustrate various formats that may be selected 81. Meanwhile, selecting 82 a size may be an option of a pet owner. It is more often the selection of a particular manufacturer servicing the needs of a particular animal of a particular size.

For example, the product 10 may be provided to a horse or other equine animal, or a bovine. Meanwhile, cats, large dogs, small dogs, and the like may receive a product selected 82 for a size appropriate to the animal. Cats and dogs, in particular, are particularly susceptible to administration of medicine 50 by a wrapper 20 in accordance with the invention, due to their tendency to gulp rather than chew morsels of food.

Selecting 83 a principal material 16 may involve its own entire process compounding ingredients to provide the taste, texture, adhesive quality, moldability, durability over time, and resistance to oxidation, melting, deforming, or other degradation. Thus, selecting 83 a material 16 may be a substantial process in and of itself.

Selecting 84 an accent 18 or flavor burst 18 may include the option of selecting 84 no accent 18. Selecting 84 an accent 18 may also include selecting a location and a mechanism for placing the accent 18 at that location. For example, an accent 18 may be on an outside surface 72 of a wrapper 20, opposite the pill 50. Alternatively, an accent 18 may be on an inside surface 72 in contact with a pill 50.

Selecting 85 molding tooling involves several additional steps including the molding technique. For example, casting, modestly pressurized molding, high-pressure injection molding, open molding, pouring, cooling to set a hot poured material 16, extruding, rolling, pressing, and the like may be considered as molding techniques. Accordingly, selecting 85 the molding tooling includes selecting the technique, the mold itself, and all the supporting machinery necessary to operate the mold.

For example, some mechanism for feeding, such as an auger, mill, mixer, extruder, or the like may be required. Other handling mechanisms such as trays, spouts, pipes, and the like may be needed to deliver the material 16 to a mold, while also providing for extraction of the wrapper 20 from the mold.

Processing 86 the materials 16 may involve many of the equipment pieces and steps alluded to hereinabove. For example, mixing, grinding, pressing, kneading, pulverizing, cooking, curing, or the like may apply to the processing 86. Typically, the processing 86 should result in a stable shape of wrapper 20 that may then be foiled in a twist wrapper 60. Packaging 87 the pieces may involve manual or automated enclosure 87 of each individual wrapper 20 within a cover 60 or foil 60.

The individual pieces 61 may then be placed inside a container 60 by packaging 88 a quantity thereof preselected according to some criterion. For example, a course of treatment of two weeks, with a medicament 50 administered twice a day would require about 28 instances of the product 10 if none is lost or wasted.

Handling 89 may involve storage at several locations and at several different times, transportation between factories and distribution points, and the like Likewise, handling 89 may involve wholesale distribution, retail distribution, and the like. Thus, the product 10 must eventually leave the factory where it is manufactured to be placed in a storage location, and ultimately on a shelf or hanger at a retail establishment, veterinary clinic, or the like.

The product may then be distributed to a pet owner according to a recommendation by a veterinary professional, selection by a user, or the like. Of course, to apply 90 a wrapper 20 to its ultimate end, it must enclose a pill 50 or other medicament 50 during administration thereof to a pet, an animal who may be reluctant to accept the taste of such a medicament 50.

Referring to FIG. 17, while continuing to refer generally to FIGS. 1 through 18, a process 90 of applying 90 wrappers 20 or a single wrapper 20 may involve selecting 91 a quantity. Quantity may be based on a regimen or the like, including convenience or other criteria, as well as a flavor of the material 16. Selecting 91 may also include selecting 91 a particular size, texture, or other properties of the product 10.

Accessing 92 may involve unsealing, cutting open, or otherwise making available a wrapper 20 within a container 62 in which it has been distributed. Extracting the covered wrapper 20 is a necessity and may include other activities. Typically, the container 62 will be re-sealed 93 both in order to preserve freshness of the contained product 10, as well as keeping each of the wrappers 20 together in a single place.

Typically, a pet owner or user will unfoil 94 or unwrap 94 the enclosing cover 60. This creates an opportunity. Typically, unfoiling 94 may noise 95 to a pet an effective alert. Pavlov demonstrated decades ago the ability of an animal to anticipate a treat, such as food or the like, and associate it with various stimuli.

The unfoiling 94 will noise abroad throughout a house the crinkly sound of foil 60 of paper, cellophane, aluminum foil, or whatever material the cover 60 is formed of. This will typically bring the pet to the owner in anticipation of receiving the wrapper 20 as a treat. The user or pet owner may then expose 96 the wrapper 20 by unwrapping 65*c*.

A question or test 97 at this point is whether or not the pill 50 has previously been embedded in the wrapper 20. If not, then the pet owner may fold 98, press 98, wrap 98 or embed 98 a medicine 50 dose within a wrapper 20. Embedding 98 typically involves deforming an individual piece 61 of the material 16. Forming a wrapper 20 appropriately may require deforming, molding, mashing, folding, rolling, or the like as needed to embed 98 the medicament 50 into the wrapper 20.

The test 99 determines whether the wrapper 20 in its new shape, which will be misshapen from the original shape (see, e.g., FIG. 15 formats for configurations) is to be re-foiled for later administration. Here, re-foiling 101 is typically undertaken if a pet owner desires to prepare in advance several wrappers 20 containing appropriate pills 50 or medicine doses 50 to take along during a day or some other period of time.

For example, a pet owner may simply drop a bottle or bag of pills 50 into a plastic or other container along with several of the pieces 61 including fully wrapped 98 wrappers 20 in their covers 60 or foils 60. A user may prepare in advance the wrapper 20 as a treat to be administered immediately, or may plan on embedding 65*d* a pill 50 in a wrapper 20 at the time of administration or delivery 100 to the pet. Either works.

However, if the test 99 results in a positive outcome, then re-foiling 101 occurs. The enclosure 60 or foil 60 is re-closed about the now deformed, pill 50-containing wrapper 20. Resulting storage 102 of the pill 50 in the wrapper 20 in the foil 60 may lead to a pocket, purse, handbag, glove box, console, or other convenient location. The test 103 reflects the waiting for time to expire until the next dose of a medicine 50 is to be administered. Until the time has expired, a negative response to the test 103 indicates continued storage 102 of the foiled wrapper 20 containing its medicine 50. When time is expired, then the test 103 indicates un-foiling 94 the enclosure 60 or foil 60 with its consequent noising 95 of a signal or alert to the pet. The process 90 then continues.

One will note that if a pill 50 has already been embedded 65*d*, 98 in a wrapper 20 and re-foiled 101, then the test 97 results in a positive output. Delivering 100 the wrapper 20 as a treat 20 to the pet is accomplished forthwith. Thereafter, subsequent steps on all four may include such things as repeating the process 90, repeating a portion of the process 90, or moving on.

One may see that the use of a supply, such as a bag 62 of pieces 61 in accordance with the invention may be different from the use of an individual piece 61 or a few pieces 61 carried in a pocket, purse, handbag, or the like. Thus, a composition and method in accordance with the invention necessarily provide certain flexibility and convenience for a pet owner.

For example, if a course of treatment is typically two weeks, and a dosage is typically applied twice a day, then a bag 62 should contain about 28 pieces 61. Each piece 61 is completely isolated from the content of every other piece 61. Thus, the tacky, moldable, deformable, somewhat amorphous distortion of a wrapper 20 that is necessary for its effective use does not result in the pieces 61 sticking together in the bag 62.

Outside of some slight amount of aroma that may emanate from the surfaces of the wrapper 20, the individual pieces 61 or the wrappers 20 within the individual enclosure 60 are mechanically and chemically isolated from one another. Nevertheless, a piece 61 may be dropped, lost, wasted, or the like. Accordingly, a couple of extras may result in a bag 62 containing about 30 pieces 61 in one tailored configuration suitable for accompanying delivery of a two week regimen of treatments 50 for a pet. Other quantities may be suitable.

When drawing a piece 61 from a bag 62 or other container 62, certain covers 60, such as cellophane make a very distinctive noise. Similarly, aluminum foil makes a distinctive noise. Thus, the cover 60 or foil 60 may actually make a recognizable sound noising 95 to a pet an alert or warning, which is typically a pleasant sound. However, upon untwisting of the neck 75 by grasping the flare 77 on a cover 60, a plastic cover 60 such as cellophane will definitely make a substantial, audible, recognizable sound. A pet will typically recognize that sound as a promise giving a rise to an expectation of a treat.

Moreover, the material 16 is typically chosen to have an oil base for supporting or containing a flavor constituent. In addition, certain solid constituents may be comminuted or otherwise pulverized into a powder, granule, or the like. These can be combined with binders and compounded into a dough-like consistency. The material 16 resulting is moldable in a factory as well as by the fingertips of a user.

A palm of one hand may be used to hold the cover 20 after unwrapping 65c while the fingers of an opposite hand are used for manipulating 65d or forming 65d the wrapper 20 around the medicine 50 to be administered. Typically, the cover 60 has a function, among others, of reducing aromas. That reduction exists for at least two purposes. One is to not make the entire surrounding area smell like dog treats. Another is to preserve the flavors and aromas within the wrappers 20 until they are actually put in use.

One will note that the dimensions 78, 79 of a cover 60 provide work space literally within the cover 60 or on the cover 60. This is in order to place the medicine 50 in the wrapper 20, without transferring any of the smell, oil, or other content of the wrapper 20 onto a countertop, a hand, or whatever other work surface may be employed.

Similarly, a user may use the cover 60 in order to manipulate the wrapper 20, molding it 65d, shaping it 65d, or otherwise manipulating 65d the material 16 to enclose the medicine 50. Thus, fingers, hands, countertops, tables, and the like may be kept clean with no residue of the material 16 or composition 16 left behind.

Another benefit of a composition and method in accordance with the invention is that fingers touch the pill 50 to place it on the wrapper 20. Subsequent, direct-contact manipulation 65d may transfer trace amounts of the medicine 50 from those fingers to the outside surface of the wrapper 20. Thus, using the foil 60 as a holder 60, prevents that contamination. Since the fingers do not then contact the wrapper 20, but rather contact the cover 60, during the manipulation 65d, no residue of the pill 50 is left by the fingers. Typically medicine 50 in pills has a bitter or other distinctive taste. If it is spread on the outside surface of the wrapper 20 it is often detected and rejected by pets.

Thereafter, delivery 100 to the pet, or re-foiling 101 and storing 102 in a purse or bag may occur without the worry of oils, aromas, crumbs, particles, and the like being left behind.

In certain embodiments, the wrapper 20 may actually be formed of a thick paste 16 or a thixotropic material 16. Thixotropic material 16 and "Bingham plastics" may be compounded to support their own weight, and even some substantial amount of weight, yet distort and conform to pressure from hands, molding equipment, and the like. Thus, the material 16 may be extruded, rolled, pressed, poured, molded, stamped, or the like.

The idea of a twist wrap 60 of a suitable material to receive labeling may assist in recognition of products, by brand, product style, flavor, and the like. For example, color coding of different flavors may be a part of printing of a cover 60. Meanwhile, enclosure by the cover 60 around a wrapper 20 extends shelf life, and prevents aromas from escaping that may be pleasant to a pet but less so to a human.

Convenience, storage, the ability to carry, the ability to administer, while continuing to maintain clean hands, clean counters, tables, and other work surfaces, as well as a clean purse or handbag provide considerable flexibility in how and when a pet owner may administer 100 a medicine 50 in a wrapper 20 to a pet needful thereof.

Thus, sizes are optional, shapes are optional, the automation of the twist wrap 60 may be done by conventional manufacturing methods or newly developed methods. All the while, "foils" 60 protect the properties of the material 16, keeping individual pieces 61 from sticking together, and keeping and preventing the material 16 from sticking to the inner surface of a bag 62 or other container 62.

This last concept is significant. Typically, materials that have residues, such as oils, result in the inside surface of a container 62 picking up and spreading out the oil content. In a method and composition in accordance with the invention, the cover 60 isolates each wrapper 20 from not only of other wrappers 20 as individual pieces 61, but from the surface of the containing bag 62.

Thus, reaching inside the bag does not result in aromatic oil or offensively odorous oil on the hands, requiring yet another hand washing. Moreover, the flare 77 outside of the neck 75 on each wrapped piece 61 or each foiled piece 61 makes an easy handle for grabbing one or several. Thus, they may be easily and cleanly retrieved from the original source bag 62 or container 62 provided by a manufacturer Likewise, pieces 61 may be withdrawn from a pocket, purse, bag, briefcase, backpack, or other place of storage when needed.

Figure 18:
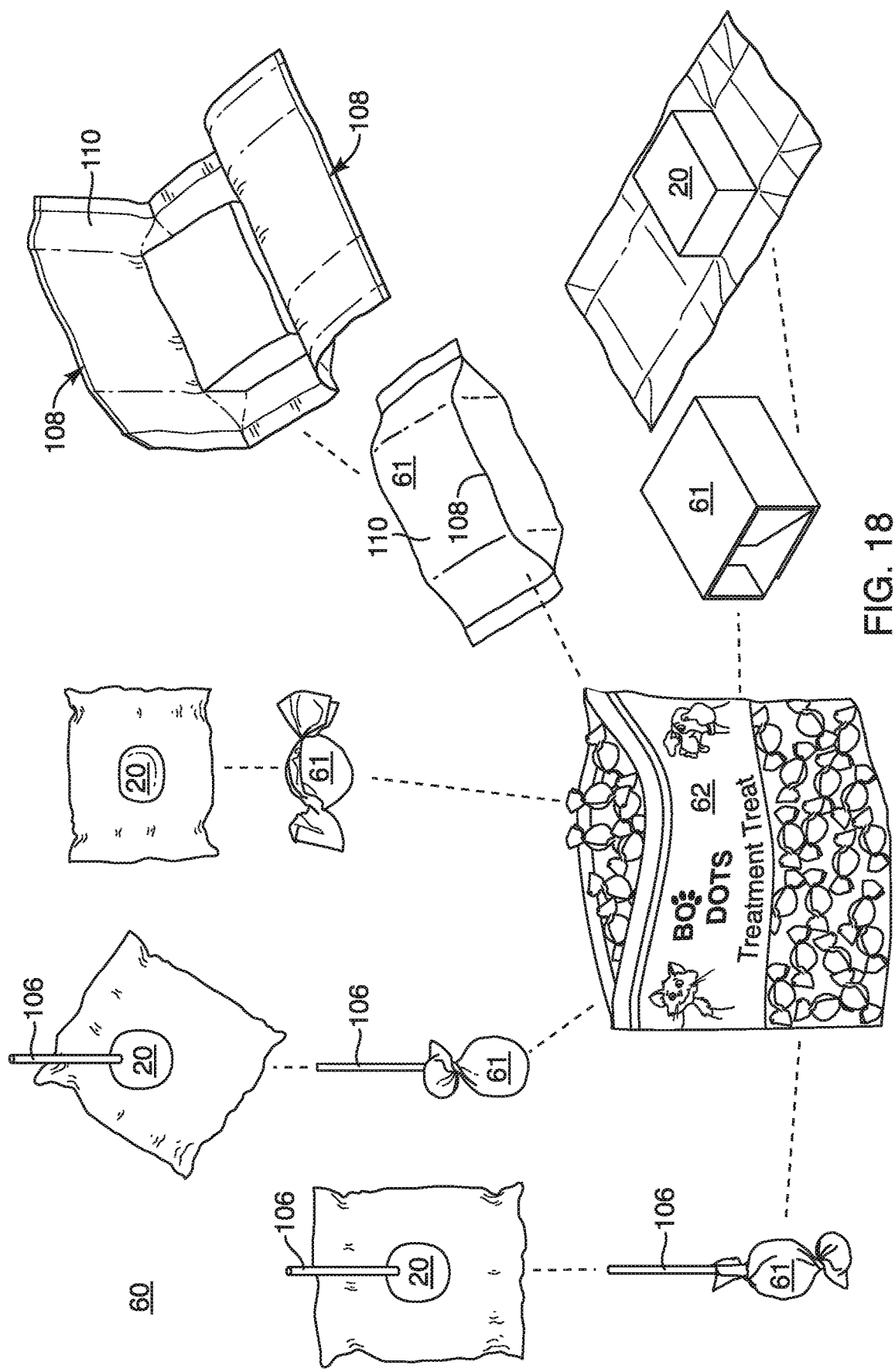
FIG. 18 is a schematic block diagram of various embodiments of wrapping a medicine dose in packaging in accordance with the invention.

Referring to FIG. 18, various machinery, methods, and packaging materials may be used for the initial, commercial packaging of the morsels 20 used as wrappers 20 in accordance with the invention. For example, although the material 16 is necessarily malleable in order to be formed around a medicament 50, it may be frozen, cooled, or otherwise firmed sufficiently to be automatically covered 60 in preparation for final packaging in a container 62 for retail distribution.

In the illustrated embodiments, various shapes of covers 60, may be used. In fact, a twist closure 60 may be used, as may other covering techniques and materials.

For example, in one embodiment, the cover 60 may be arranged with either one or two twist closures 75 (neck 75). Moreover, the cover 60 may be wrapped to be completely formal around the outer surface of the treat 20 (wrapper 20). Moreover, a "stick" 106 may extend into the morsel 20, looking like a lollipop. In such an embodiment, the stick 106 assists in manipulating the medicament 50 and the material 16. In certain embodiments, the stick 106 may form and maintain an opening for receiving the medicament 50. It may also be used to poke the medicament 50 such as a pill 50 or tablet 50 into the aperture from which the stick 106 has been removed.

A basic benefit of the cover 60, in addition to maintaining isolation of each wrapper 20 in its container 62, is to provide a platform 60 on which or within which a pet owner may manipulate the wrapper 20 to contain and obscure the flavor or a medicament 50. Accordingly, processes and materials must be extended to provide additional size for the cover 60. Wrapping techniques for candies are typically inadequate. The size of the cover 60 is best operable if it extends completely around the wrapper 20 plus an additional half. From about ⅓ to about ⅔ of the circumference of the maximum girth of a morsel 20 (wrapper 20) has been deemed appropriate. Other sizes will function, but create more difficulty in the manipulation if too small, and more difficulty in wrapping, if too large.

For example, a twisted cover 60 may be packaged in the straight forward manner as described hereinabove. However, a bar-shaped embodiment, as illustrated above may use a resealable seam 108 on an extended flap 110 formed in the cover 60, in order to meet the needs of retail packaging, yet subsequent manipulation space for a pet owner. Such a flap 110 may provide an additional 50-100% of area or circumference extent around the girth (whether or not that girth is maximum or minimum) on a bar-shaped wrapper 20, as illustrated. Likewise, for example, the caramel-type cover 60 of a parallelepiped-shaped wrapper 20 may simply use additional material, requiring wrapping more like a gift wrap to provide the additional, working area. Similarly, a lollipop shaped cover 60 may have a single twist 75 around the stick 106, or a double twist 75 around the stick 106 and the opposite side of the wrapper 20. The extra twist 75 may be a mechanism for both packaging and providing additional working surface area for manipulating the wrapper 20.

The present invention may be embodied in other specific forms without departing from its purposes, functions, structures, or operational characteristics. The described embodiments are to be considered in all respects only as illustrative, and not restrictive.

The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for medicating an animal, the method comprising:
   selecting a morsel of edible material, malleable by fingers of a hand by a user, the morsel enclosed in a cover, formed of a material and size remaining substantially intact during manipulation of the morsel to surround a medicament;
   selecting a medicament;
   opening the cover; and
   obscuring at least one of taste and smell of the medicament from detection by deforming the morsel about the medicament to enclose the medicament therein;
   wherein the deforming occurs in consequence of manual manipulation of the morsel, while covered by the cover, thereby eliminating direct contact between the user and the morsel at all times from the opening the cover to administering the morsel to an animal.

2. The method of claim 1, wherein:
   the cover is impervious to at least one of water and oil;
   the cover is formed of a material and size to be selectively openable and closeable with respect to the morsel; and
   the cover is sized to expose the morsel to deformation by hands of the user while separating the hands of the user, in contact with an outside surface of the cover exclusively, from the morsel, in contact with an inside surface of the cover exclusively.

3. A method of medicating an animal, the method comprising:
   providing a wrapper formable as a morsel, having a composition edible by the animal;
   providing a cover as a sheet having an area effective to enclose the morsel against contact with fingers of a user;
   uncovering, by the user, the morsel without touching directly the morsel nor residue thereof;
   placing a medicament on the morsel; and
   embedding the medicament by deforming the morsel around it, by manual manipulation transferring pressure from the fingers to the morsel through the cover, exclusively.

4. The method of claim 3 comprising administering the medicament by offering the morsel containing the medicament to the animal, while the fingers remain separated from the morsel by the cover continually.

5. The method of claim 3, comprising storing the morsel by fully covering the morsel with the cover and later opening the cover before the offering to the animal.

6. The method of claim 5, wherein the cover is a sheet having a length and width, each being orders of magnitude larger than a thickness thereof, the area being continuous at all times from an initial enclosure of the morsel, through the deforming and offering.

7. The method of claim 6, wherein:
   the cover is formed of a material impervious to at least one of water and oil; and
   the area is sufficiently large to eliminate contact of the fingers directly with the morsel at all times.

8. The method of claim 3, wherein the area is sized to completely re-enclose the morsel and medicament after the embedding.

9. The method of claim 3 the morsel is sized to completely obscure from sight, taste, and smell the medicament after the embedding.

10. The method of claim 3, wherein the area is sufficient to eliminate any need for any other object to contact the medicament and the morsel.

11. A method of medicating an animal, the method comprising:
   selecting a wrapper as a morsel, edible, malleable by pressure applied by fingers, and completely enclosed in a cover having an area sufficient to shield the fingers entirely from contacting directly the morsel at any time;

exposing the morsel without the morsel nor its residue contacting the fingers directly; and embedding a medicament completely within the morsel by re-shaping the morsel by the fingers applying pressure through the cover, exclusively.

12. The method of claim 11, comprising re-applying the cover to completely enclose the morsel, containing therewithin the medicament.

13. The method of claim 12, comprising administering the morsel containing the medicament to the animal.

14. The method of claim 11, comprising offering the morsel, obscuring the medicament against detection, by sight, smell, and taste, to the animal.

15. The method of claim 11, wherein the cover is impervious to at least one of water and oil; and the cover has a size and material properties to support deforming the morsel by the fingers without destruction of the cover.

16. The method of claim 11, wherein the wrapper is formed as a sheet having an area defined by a width and a length, both of which are orders of magnitude larger than a thickness thereof.

17. The method of claim 11, wherein:

the cover is sized to re-wrap the morsel and medicamenet after the re-shaping to store the morsel for later administration to the animal; and the wrapper composition is selected to completely obscure the medicament from sight and smell of the animal.

18. The method of claim 11, comprising drawing the wrapper from a container holding a plurality of other wrappers, mutually isolated by corresponding other covers having physical properties in common the cover.

19. The method of claim 18, comprising selecting the container based on contents thereof.

20. The method of claim 19, wherein the plurality of wrappers contain flavors corresponding to foodstuffs.

\* \* \* \* \*